US007226357B2

(12) United States Patent
Vancura

(10) Patent No.: US 7,226,357 B2
(45) Date of Patent: Jun. 5, 2007

(54) MECHANICAL WHEEL CASINO GAME OF CHANCE HAVING A FREE-MOTION INTERNAL INDICATOR AND METHOD THEREFOR

(75) Inventor: Olaf Vancura, Las Vegas, NV (US)

(73) Assignee: Progressive Gaming International Corporation, Las Vegas, NV (US)

( * ) Notice: Subject to any disclaimer, the term of this patent is extended or adjusted under 35 U.S.C. 154(b) by 34 days.

(21) Appl. No.: 11/172,116

(22) Filed: Jun. 30, 2005

(65) Prior Publication Data

US 2006/0009278 A1 Jan. 12, 2006

Related U.S. Application Data

(60) Provisional application No. 60/586,115, filed on Jul. 7, 2004.

(51) Int. Cl.
*A63F 13/00* (2006.01)

(52) U.S. Cl. ........................................................ 463/16

(58) Field of Classification Search ............ 463/16–17, 463/20, 25; 273/121 B
See application file for complete search history.

(56) References Cited

U.S. PATENT DOCUMENTS 2,032,677 A 3/1936 Watson
3,405,459 A 10/1968 Belokin, Jr.
4,072,930 A 2/1978 Lucero et al.
4,108,361 A 8/1978 Krause
4,283,709 A 8/1981 Lucero et al.
4,531,187 A 7/1985 Uhland
5,360,214 A 11/1994 Harmen
5,496,032 A 3/1996 Okada
5,639,089 A 6/1997 Matsumoto et al.
5,785,594 A 7/1998 Seibert, Jr. et al.
5,823,874 A 10/1998 Adams
5,848,932 A 12/1998 Adams
5,971,851 A 10/1999 Pascal et al.
6,047,963 A 4/2000 Pierce et al.
6,082,734 A 7/2000 Uehara et al.
6,164,646 A 12/2000 Uehara et al.
6,338,678 B1 1/2002 Seelig et al.

(Continued)

OTHER PUBLICATIONS

Bally Monte Carlo Slot Machine #1: Document with original color JPEG image of game tag of 1977 Bally Monte Carlo slot machine #1 (40% scaled).

(Continued)

*Primary Examiner*—Kim Nguyen
(74) *Attorney, Agent, or Firm*—Dorr, Carson & Birney, P.C.

(57) ABSTRACT

A mechanical wheel casino game of chance using a freely moving internal indicator such as a ball within a housing to randomly move and bounce into one possible outcome segment in a set of possible outcome segments. The expected value is controlled through a combination of geometrical and mathematical considerations. The set of possible outcome segments randomly picked and placed at the bottom of the wheel so that as the wheel stops, the freely moving, bouncing ball lands in one of the possible outcome segments. The segment the ball lands in is sensed and the award associated with the landed in segment is paid out to the player. A periodic testing method determines whether mechanical bias exists in the casino game of chance.

22 Claims, 17 Drawing Sheets

U.S. PATENT DOCUMENTS

| | | | |
|---|---|---|---|
| 6,364,767 B1 | 4/2002 | Brossard et al. | |
| 6,450,884 B1 | 9/2002 | Seelig et al. | |
| 6,533,273 B2 | 3/2003 | Cole et al. | |
| 6,533,660 B2 | 3/2003 | Seelig et al. | |
| 6,582,307 B2 | 6/2003 | Webb | |
| 6,645,073 B2 | 11/2003 | Lemay et al. | |
| 6,656,043 B2 | 12/2003 | Seelig et al. | |
| 6,701,069 B1 | 3/2004 | Cezayirli et al. | |
| 6,764,396 B2 | 7/2004 | Seelig et al. | |
| 6,902,479 B1 * | 6/2005 | D'Avanzo | 463/18 |
| 6,921,072 B2 * | 7/2005 | Hughes-Watts | 273/142 E |
| 6,997,805 B2 | 2/2006 | Vancura | |
| 7,004,835 B2 * | 2/2006 | Baerlocher | 463/16 |
| 2004/0155399 A1 | 8/2004 | Inoue | |

OTHER PUBLICATIONS

Bally Monte Carlo Slot Machine #1: Document with original color JPEG image of game tag of 1977 Bally Monte Carlo slot machine #1 (49% scaled).

Bally Monte Carlo Slot machine #2: Report entitled "Bally Manufacturing Corporation Monte Carlo Slot Machine Product Analysis Report," dated Jan. 28, 2004, pp. 1-36, with original color images, prepared by TAEUS describing 1976 Bally Monte Carlo slot machine #2.

California Lottery Big Spin Regulations, Dec. 13, 2004, pp. 1-26.

Bally Monte Carlo: Oct. 18, 2001 letter from Robert Kovelman to Joseph Walkowski.

Bally Monte Carlo: Document with photocopies image of upper portion of 1977 Bally Monte Carlo slot machine #1 enclosed with Oct. 18, 2001 letter.

Bally Monte Carlo: Document with photocopied image of entire 1977 Bally Monte Carlo slot machine #1 enclosed with Oct. 18, 2001 letter.

Bally Monte Carlo: 1-page sheet enclosed with Oct. 18, 2001 letter showing and describing 1977 Bally Monte Carlo game.

Bally Monte Carlo: 1-page advertisement enclosed with Oct. 18, 2001 letter showing Bally Monte Carlo game, dated 1978.

Bally Monte Carlo: 1-page document enclosed with Oct. 18, 2001 letter listing model numbers, names and release dates for various Bally games, including Model Nos. 1117 for Danish Monte Carlo released Jan. 5, 1977 and Model No. 1117-1 for Australian Monte Carlo released Jan. 18, 1977.

Bally Monte Carlo: 1-page document enclosed with Oct. 18, 2001 letter showing image of three 2001 Bally Monte Carlo slot machines.

Bally Monte Carlo Slot Machine #1: Oct. 19, 2001 email from Robert Kovelman to Joseph Walkowski.

Bally Monte Carlo Slot Machine #1: Document with original color image of upper portion of 1977 Bally Monte Carlo slot machine #1 enclosed with Oct. 19, 2001 email.

Bally Monte Carlo Slot Machine #1: Document with original color image of entire 1977 Bally Monte Carlo slot machine #1 enclosed with Oct. 19, 2001 email.

Bally Monte Carlo Slot Machine #1: Oct. 23, 2001 email from Robert Kovelman to Joseph Walkowski regarding 1977 Bally Monte Carlo Slot machine #1, 2 pages.

* cited by examiner

FIGURE 13

| Segment | a (inches) | b (inches) | Ball Center of Gravity (inches) |
|---|---|---|---|
| 1 | 0 | 2.079 | 0.946 |
| 2 | 2.079 | 4.068 | 2.797 |
| 3 | 4.067 | 5.878 | 4.526 |
| 4 | 5.878 | 7.431 | 6.057 |
| 5 | 7.431 | 8.660 | 7.323 |
| 6 | 8.660 | 9.511 | 8.269 |
| 7 | 9.511 | 9.945 | 8.854 |
| 8 | 9.945 | 9.945 | 9.052 |
| 9 | 9.945 | 9.511 | 8.854 |
| 10 | 9.511 | 8.660 | 8.269 |
| 11 | 8.660 | 7.431 | 7.323 |

FIGURE 14

| Segment | a (inches) | b (inches) | Ball Center of Gravity (inches) |
|---|---|---|---|
| 1 | 0 | 1.492 | 0.663 |
| 2 | 1.492 | 2.891 | 1.949 |
| 3 | 2.891 | 4.107 | 3.111 |
| 4 | 4.107 | 5.066 | 4.079 |
| 5 | 5.066 | 5.706 | 4.790 |
| 6 | 5.706 | 5.988 | 5.200 |
| 7 | 5.988 | 5.894 | 5.283 |
| 8 | 5.894 | 5.429 | 5.034 |
| 9 | 5.429 | 4.623 | 4.469 |
| 10 | 4.623 | 3.527 | 3.624 |
| 11 | 3.527 | 2.209 | 2.550 |

FIGURE 15

| Segment | a (inches) | b (inches) | Ball Center of Gravity (inches) |
|---|---|---|---|
| 0 | -1.139 | 1.139 | 0 |
| 1 | 1.1399 | 3.323 | 2.054 |
| 2 | 3.323 | 5.239 | 3.942 |
| 3 | 5.239 | 6.730 | 5.510 |
| 4 | 6.730 | 7.676 | 6.632 |
| 5 | 7.676 | 8.000 | 7.217 |
| 6 | 8.000 | 7.676 | 7.217 |
| 7 | 7.676 | 6.730 | 6.632 |
| 8 | 6.730 | 5.239 | 5.510 |
| 9 | 5.239 | 3.323 | 3.942 |
| 10 | 3.323 | 1.139 | 2.054 |

FIGURE 16

| I | II | III | IV | V | VI | VII | VIII | IX | X |
|---|---|---|---|---|---|---|---|---|---|
| Seg | V | $P_B$ | (L3-B) | (L2-B) | (L1-B) | B | (R1-B) | (R2-B) | (R3-B) |
| 1 | 50 | 0.02 | -0.6 | -0.1 | 0.2 | 1 | 0.5 | -0.2 | -0.5 |
| 2 | 75 | 0.05 | -1.5 | -0.75 | -1.25 | 3.75 | -1.75 | -2.5 | 8.75 |
| 3 | 40 | 0.035 | 0.7 | 0.35 | 1.225 | 1.4 | -0.525 | 7.35 | -0.175 |
| 4 | 25 | 0.02 | 0.5 | 1 | 0.3 | 0.5 | 4.5 | 0.2 | 0.3 |
| 5 | 250 | 0.1 | -17.5 | -21 | -22.5 | 25 | -21.5 | -21 | -15 |
| 6 | 35 | 0.02 | 0.1 | -0.2 | 4.3 | 0.7 | 0.1 | 1.3 | -0.2 |
| 7 | 40 | 0.04 | -0.6 | 8.4 | -0.2 | 1.6 | 2.4 | -0.6 | 0.8 |
| 8 | 100 | 0.05 | 7.5 | -3.25 | -3 | 5 | -3.75 | -2 | -4.5 |
| 9 | 25 | 0.03 | 0.3 | 0.45 | 2.25 | 0.75 | 1.05 | -0.45 | 3 |
| 10 | 60 | 0.04 | -0.8 | 1.6 | -1.4 | 2.4 | -2 | 2.6 | -1.2 |
| 11 | 10 | 0.06 | 5.4 | 0.9 | 3 | 0.6 | 6.9 | 1.2 | 3.9 |
| 12 | 125 | 0.03 | -3 | -1.95 | -3.45 | 3.75 | -2.85 | -1.5 | -2.4 |
| 13 | 30 | 0.04 | 1.2 | -0.8 | 3.8 | 1.2 | 1.8 | 0.6 | 18.8 |
| 14 | 75 | 0.06 | -3.9 | 3 | -2.7 | 4.5 | -1.8 | 25.5 | -1.5 |
| 15 | 45 | 0.06 | 4.8 | -0.9 | 1.8 | 2.7 | 27.3 | 0.3 | 2.1 |
| 16 | 500 | 0.03 | -14.1 | -12.75 | -13.65 | 15 | -13.5 | -12.6 | -12.75 |
| 17 | 50 | 0.065 | 1.625 | -0.325 | 29.25 | 3.25 | 1.95 | 1.625 | -1.95 |
| 18 | 80 | 0.05 | -1.75 | 21 | -1.5 | 4 | -0.25 | -3 | -1.75 |
| 19 | 75 | 0.04 | 17 | -1 | 0.2 | 3 | -2.2 | -1.2 | -0.6 |
| 20 | 20 | 0.1 | 3 | 6 | 5.5 | 2 | 2.5 | 4 | 3 |
| 21 | 45 | 0.05 | 1.75 | 1.5 | -1.25 | 2.25 | 0.75 | 0.25 | 1.5 |
| 22 | 60 | 0.01 | 0.15 | -0.4 | -0.15 | 0.6 | -0.1 | 0.15 | -0.2 |
| Total | | 1 | | | | | | | |
| EV | | | | | | 84.95 | | | |
| Diff EV (TOTAL) | | | 0.275 | 0.775 | 0.775 | | -0.475 | 0.025 | -0.575 |

FIGURE 17

| Segment at bottom | # left L (actual) | # bottom B (actual) | # right R (actual) | TOTAL |
|---|---|---|---|---|
| 1 | 15 | 19 | 14 | 48 |
| 2 | 17 | 54 | 25 | 96 |
| 3 | 35 | 70 | 39 | 144 |
| 4 | 21 | 45 | 31 | 97 |
| 5 | 8 | 24 | 13 | 45 |
| 6 | 34 | 121 | 75 | 230 |
| 7 | 31 | 77 | 44 | 152 |
| 8 | 33 | 84 | 71 | 188 |
| TOTAL | 194 | 494 | 312 | 1000 |

FIGURE 18

| Seg at bottom | # left L (actual) | # left L (expected) | SD (# left (expected)) | Diff in SD |
|---|---|---|---|---|
| 1 | 15 | 9.3 | 3.1 | 1.8 |
| 2 | 17 | 18.6 | 4.3 | -0.4 |
| 3 | 35 | 27.9 | 5.3 | 1.3 |
| 4 | 21 | 18.8 | 4.3 | 0.5 |
| 5 | 8 | 8.7 | 2.9 | -0.2 |
| 6 | 34 | 44.6 | 6.7 | -1.6 |
| 7 | 31 | 29.5 | 5.4 | 0.3 |
| 8 | 33 | 36.5 | 6.0 | -0.6 |

MECHANICAL WHEEL CASINO GAME OF CHANCE HAVING A FREE-MOTION INTERNAL INDICATOR AND METHOD THEREFOR

RELATED APPLICATIONS

This non-provisional patent application claims the benefit of U.S. Provisional Patent Application Ser. No. 60/586,115 filed on Jul. 7, 2004 entitled "Wheel for Internal Indicator and Controlled Expected Value for Casino Game."

BACKGROUND OF THE INVENTION

1. Field of the Invention

The present invention relates to casino gaming and, in particular, to gaming machines having mechanical bonus wheels.

2. Discussion of the Background

Before the advent of modern day computers, gaming regulators approved gaming machines that were purely mechanical in nature. Many gaming machines used mechanical reels and/or wheels. At the time of the mechanical spin, the spin outcome was unknown. Today, regulators hold new gaming machines to a much higher standard. Prior to the reel or wheel spin, the outcome is already known, and machines are generally required to check that the spin outcome depicted matches the predetermined outcome. Another important facet of today's gaming machine is the ability, within the precision required by gaming regulators, to demonstrate a calculable and predictable "expected return" on the part of the player (or alternately from the point of view of the house, "house advantage").

Novel bonus games, particularly those encompassing a mechanical apparatus, are popular in current casino gaming machines. When a bonus game is combined with an underlying slot machine, the entire game must comply with regulatory requirements. As such, bonus games of a mechanical nature are desirable (due to eye-candy appeal to players) but, too often, resort to predetermined outcomes (due to regulatory hurdles).

The use of a wheel in a casino game top box is conventional, such as that found in mechanical wheel games of U.S. Pat. Nos. 5,823,874 and 5,848,932. In these wheel bonus games, a static indicator (stationary pointer) remains motionless while an adjacent mechanical wheel rotates. In this approach, the wheel gradually slows down and stops, with the segment on the wheel indicated by the pointer representing the player's win. The "MONTE CARLO" from Bally Corporation top box concept (originally a 1970s game with a "parallel" bonus in which the player continued to wager, and recently revived by Bally as a conventional bonus game with the same name) takes a slightly different approach in which the mechanical indicator is dynamic (moving pointer) while the wheel is static. In the Bally approach, the pointer rotates, in the plane of the surface of the wheel, and stops, with the segment on the wheel indicated by the pointer representing the player's win. Both of these current approaches utilize a predetermined outcome, such as a computer controlling a stepper motor to stop the wheel at a precise, predetermined outcome (i.e., a segment of the wheel having a "value")—the actual spin of the "wheel" is simply a cosmetic fait accompli.

The California Lottery has a TV game trademarked "THE BIG SPIN" in which a free moving ball is housed internally in a wheel whose segments depict awards. The wheel is spun by a contestant to determine the contestant's award. The free moving and usually bouncing ball finally lands in a segment representing the winning award. The California Lottery Commission retains an independent auditor to carefully examine and test the wheel and equipment prior to each television show. However, from a gaming perspective, having people check the equipment, such as prior to each play (or each hour or each day), is completely impractical, as hundreds or thousands of operations (i.e., game plays) may occur on each of the hundreds or thousands of gaming devices every day in the casino environment. Similarly, it is also impractical to have the player physically spin the wheel while an agent of the casino visually determines the outcome. THE BIG SPIN wheel freely spins and the ball freely lands in an award segment. The contestant views the wheel spin, which is witnessed by the state and further "verified" by a live television audience. This represents a methodology that is highly impractical and/or would not pass regulatory approval for automated slot machine use in a casino.

Roulette and the large casino wheels such as the Big Six wheel are considered casino table games and do not have the same regulatory hurdle of slot/automated gaming machines due to the presence of a casino employee at each spin. In the sense of having a casino/lottery agent verifying game outcome, THE BIG SPIN wheel is similar to the Big Six wheel.

In U.S. Pat. No. 6,047,963, any bias in the mechanical components of the Pachinko top box, as a bonus game to an underlying casino slot machine, is eliminated. Lane values are randomly selected and "locked-in" to the lanes. Thereafter, a ball is released from the top of the playfield and, after traversing a forest of deflecting pins, settles into a lane. The lane "selected" by the ball represents the player's win. A distinct advantage to this approach is that the influence of any mechanical imperfections or biasing problems are eliminated by the disclosed methodology of assigning lane values, such that both the player and the casino are protected from faulty equipment. As a corollary, neither the casino nor the regulators need to check the Pachinko equipment any more often than usual.

While modern bonus "wheels" in gaming devices have been successful, nevertheless a player may feel that the gaming machine is controlling the outcome, because the final arrangement of the indicator and wheel, in these modern versions, is carefully controlled by a processor and a stepper motor and in no way represents free motion. Indeed, the final outcome of the wheel game is predetermined before the "spin" even begins. For example, in current wheel bonus games, it is common for the wheel to come to rest at a nominal value (say, $25), having just passed an adjacent segment of high value (say, $500). Although this leads to some suspense on the part of the player, it also may lead the player to a feeling of "undue control" by the gaming machine.

The Pachinko approach discussed above alleviates this problem in that, once the lane values are randomly locked-in, the free motion of the Pachinko ball dictates the outcome of the game. The contrivance of a pre-determined outcome to the various possible awards is eliminated, to the benefit of the players.

A need exists to develop a mechanical wheel-type casino game of chance in which the final outcome is not predetermined and controlled precisely by a computer in the gaming machine.

A further need exists to develop a mechanical wheel-type of casino game of chance in which free motion is used to determine the final outcome.

A need further exists to develop a mechanical wheel-type of casino game of chance in which both the "indicator" and the "wheel" have dynamic mechanical motion, instead of one or the other being static. It would be desirable to use a freely moving ball, or similar bouncing object, as the indicator.

A need further exists to develop a wheel-type of casino game of chance similar to the California Lottery THE BIG SPIN wheel, wherein the spin and determination of the outcome are performed automatically, and wherein the expected value of such a casino game is nevertheless calculable and controlled to mitigate mechanical bias, such that the game may be approved by regulators. Because of the free-motion nature of the game, it would be further desirable to self-monitor the outcomes to check that no mechanical bias has crept in.

A final need exists to incorporate such features in a casino game of chance as a bonus game to underlying gaming machines such as slot gaming machines.

SUMMARY OF THE INVENTION

The aforementioned needs are attained through the following inventions.

A free-motion ball serves as a dynamic internal indicator and is housed in a rotatable mechanical wheel, divided into segments each with an award value, driven by a processor-controlled stepper-motor. The wheel is spun, thus agitating the free-motion ball and making it bounce considerably within the wheel housing, and then slowly the wheel is brought to a stop. The ball's final resting segment on the wheel determines the award.

The novel casino game of chance and method comprises a unique arrangement of the award values of the wheel segments, a predetermined stopping orientation of the wheel, and a geometry of the ball/segments/pins such that the ball must come to rest in specific predefined wheel "possible outcome segments" relative to the stopping orientation of the wheel. The combination of these attributes provides a calculable expected value, which can be controlled even with biased equipment, while allowing free-motion of the ball. In this manner, all of the needs as stated previously are fulfilled, giving the player a rewarding experience while protecting the casino and player.

BRIEF DESCRIPTION OF THE DRAWINGS

FIG. 13 is a table showing the operation of the ball's center of gravity to land in a possible outcome segment and not to land elsewhere for an even number (8) possible outcome segments in a set.

FIG. 14 is a table showing the operation of the ball's center of gravity to land in a possible outcome segment and not to land elsewhere for an even number (6) possible outcome segments in a set.

FIG. 15 is a table showing the operation of the ball's center of gravity to land in a possible outcome segment and not to land elsewhere for an odd number (7) possible outcome segments in a set.

FIG. 16 sets forth a table showing an example calculation for the player's expected value in the play of a casino game of chance of the present invention.

FIG. 17 sets forth in a table an example of the probabilities of the ball landing in one of three possible outcome segments for a wheel having eight sets.

FIG. 18 sets forth in a table an example of results of periodically testing the operation of the mechanical wheel of the present invention for bias based on the example of FIG. 17.

Figure 1:
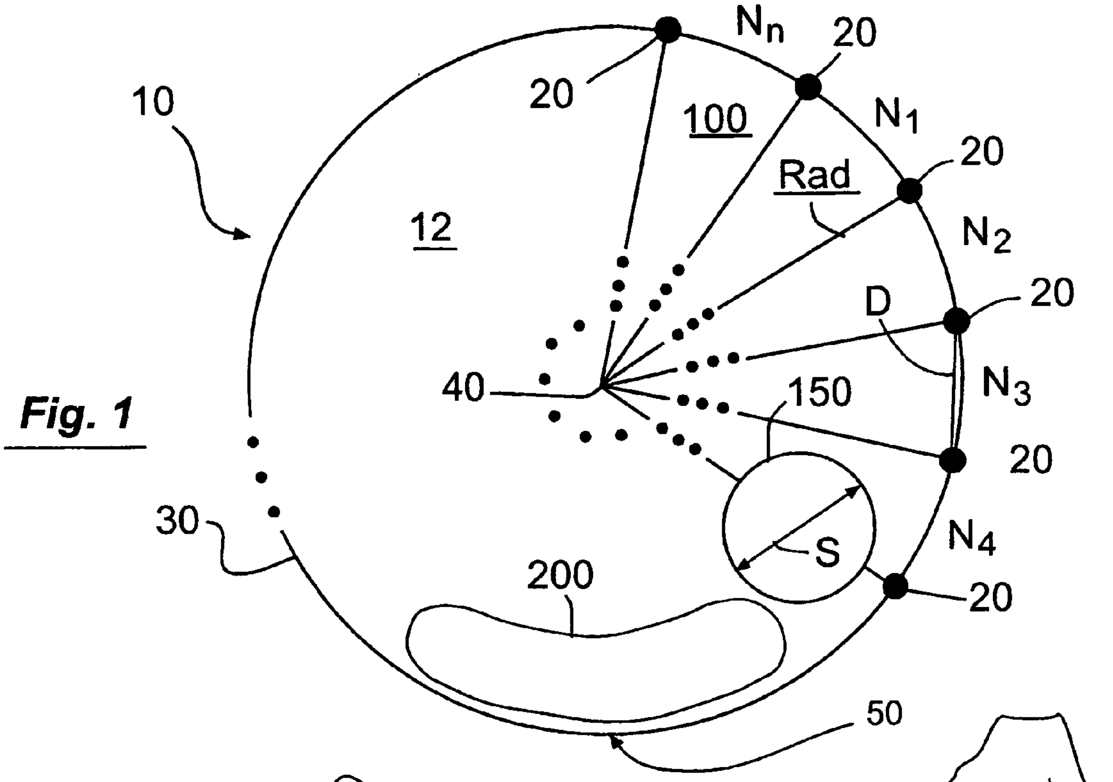
FIG. 1 sets forth an illustration of one embodiment of the mechanical wheel of the present invention.
Figure 2:
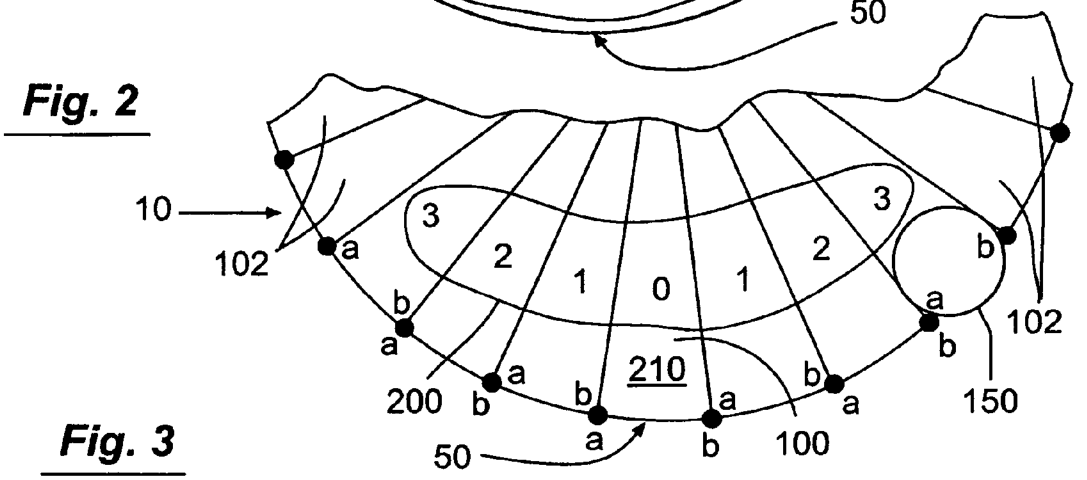
FIG. 2 sets forth the mechanical wheel of FIG. 1 having an odd number of possible segment outcomes in a set located at the bottom of the wheel.
Figure 3:
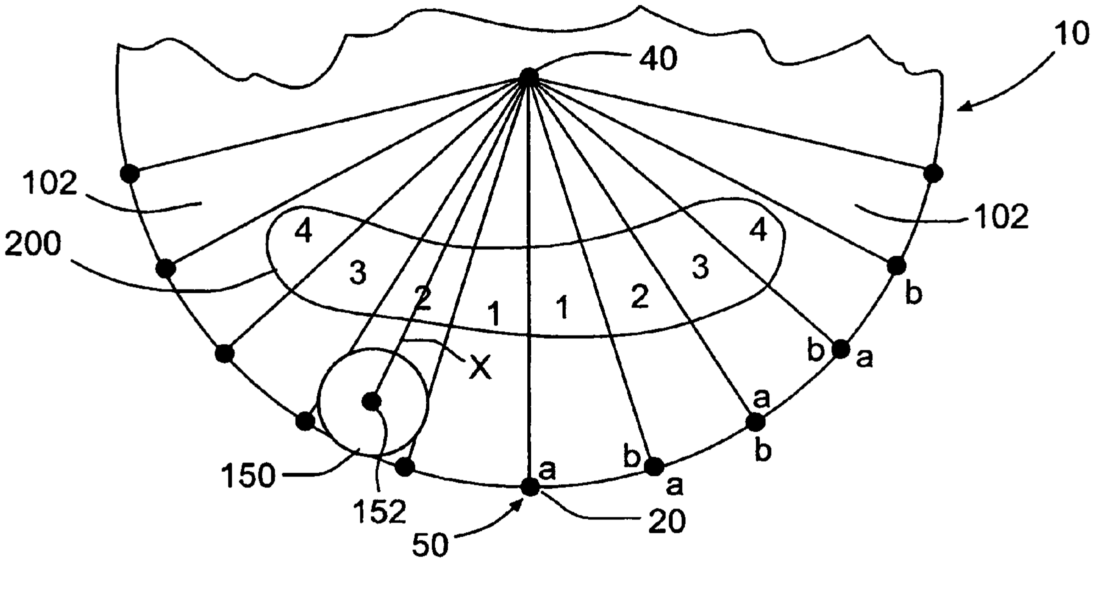
FIG. 3 is the mechanical wheel of FIG. 1 having an even number of possible segment outcomes in a set located at the bottom of the wheel.

DETAILED DESCRIPTION OF THE INVENTION a. Overview:

The mechanical wheel 10 assembly itself is comprised of a disc 12, as illustrated in FIG. 1, upon which are affixed pins 20 (e.g., by screwing pins into formed threaded holes on the wheel 10) around the outer periphery 30. Each segment 100 (or pie piece) is bounded by the radius, "Rad" from the center 40 of the wheel 10 to one pin 20, an adjacent radius Rad from the center of the wheel 10 to an adjacent pin 20, and the straight line chord distance, "D", between the centers of the one pin 20 and the adjacent pin 20. A ball 150 having a diameter "S", is provided to land on one of a number of possible outcome segments shown in a set 200 (as shown in FIGS. 2 and 3) located at the bottom 50 of the wheel 10 as the wheel stops. A ball 150 or any similar or suitable mechanical object can be used as the free moving internal indicator. Likewise, pins 20 can be any similar or suitable mechanical object that provides distinct segments to hold a landed ball 150 such as a peg, a ridge, etc. Or, e.g., half-shelled cups can be utilized allowing the ball 150 to settle within.

For a radius Rad from center 40 of wheel 10 to center of pin 20, and a number N of wheel segments 100, the chord distance D between adjacent centers of pins 20 is:

$$D = 2Rad\,\sin(180/N) \qquad \text{(FORMULA 1)}$$

For example, let N=30 segments and Rad=10 inches, then D=2.091 inches.

If an odd number of possible outcome segments in set 200 is desired, the wheel 10 will be stopped with one segment 100 centered on the bottom 50. If an even number of possible outcome segments in set 200 is desired, the wheel 10 will be stopped with a pin 20 on the bottom 50. For an odd number example, if seven possible outcome segments in set 200 are desired (as shown in FIG. 2), the wheel stops with one segment (labeled "0" in possible outcome segment set 200) on the bottom 50. This allows the free-motion ball 150 to land in segment labeled "0" or to also possibly land in the 6 adjacent segments (all of which are tilted with three segments (labeled "1"–"3") uniformly disposed upwardly on either side of the bottom segment (labeled "0")). The ball 150 is not to land in any of the other segments 100 of the wheel 10. These other "undesirable" segments are labeled 102. For an even number example, if eight possible outcome segments in set 200 are desired as shown in FIG. 3, the wheel 10 stops with a pin 20 at the bottom 50. Pin 20 at bottom 50 is between two centered and adjacent segments each labeled "1." The ball 150 can randomly (as it is free-moving) land in any one of the eight possible outcome segments 200 shown in FIG. 3 (labeled "1"–"4") uniformly disposed upwardly on either side of bottom 50 pin 20.

Figure 4:
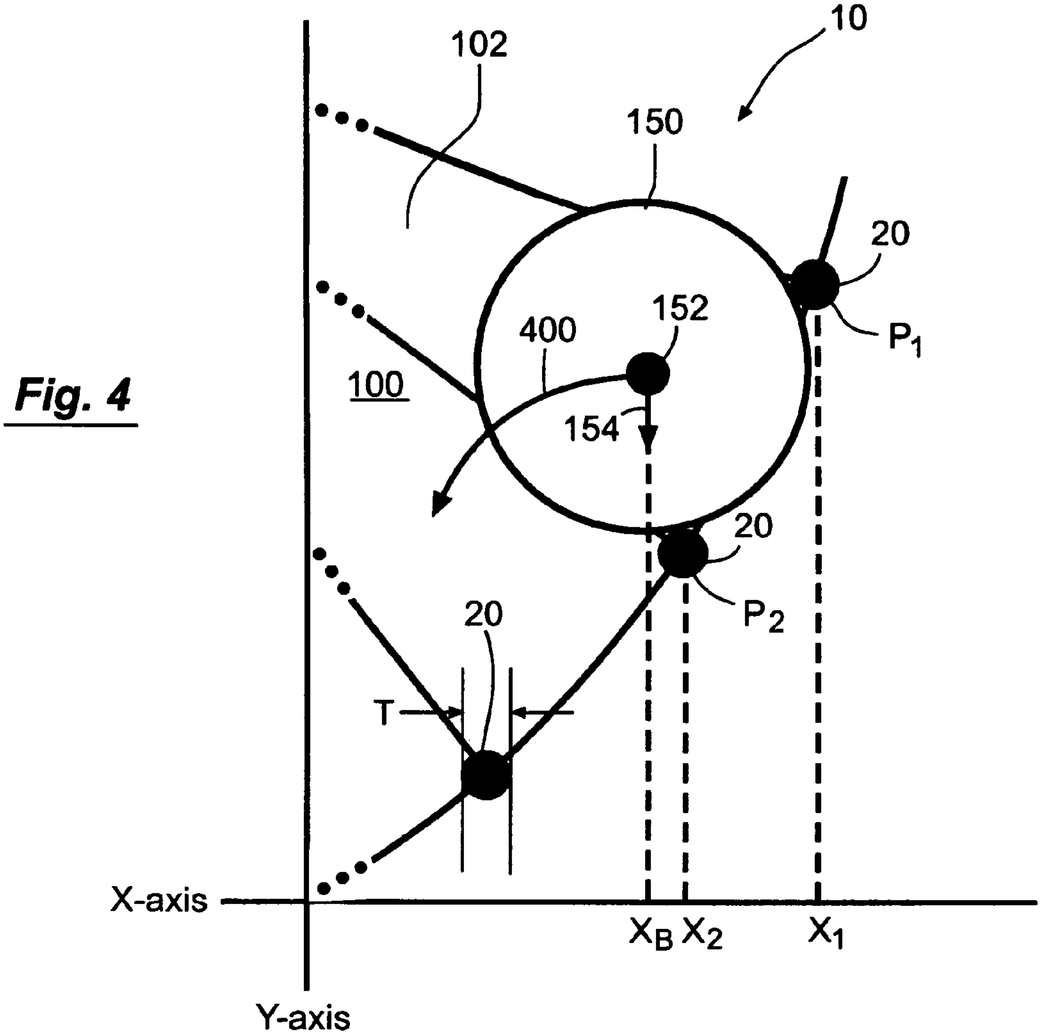
FIG. 4 illustrates the "release" of a ball from a segment.

The manner in which this is accomplished is to choose a ball 150 having a diameter S (as shown in FIG. 1), in addition to the previous variables Rad and N, such that if the ball 150 were to try to "settle" in an undesirable segment 102 once the wheel 10 is stopped, the center of mass 154 of the ball 150 would be located outside the confines of the pins 20 (labeled $P_1$ and $P_2$ bounding the undesirable segment 102). The ball 150 would again fall out (arrow 400) of the undesirable segment 102 as illustrated in FIG. 4. Gravity acting on the center of mass 154 causes the ball 150 to move 400 out.

The distance X (as shown in FIG. 3) from the center 152 of the ball 150 having diameter S to the center 40 of the wheel, when resting on two adjacent pins 20 is:

$$X=\{Rad\hat{\ }2-(D/2)\hat{\ }2\}\hat{\ }(½)-\{(S/2)\hat{\ }2-(D/2)\hat{\ }2\}\hat{\ }(½) \quad \text{(FORMULA 2)}$$

In an example where Rad=10 inches, S=2.75 inches, and D=2.091 inches, then X=9.0519 inches.

Now, taking the x-y plane as that of the wheel 10, with the y-axis along the vertical and the x-axis along the horizontal as shown in FIG. 4, the ball 150 will be unable to "settle" onto two adjacent pins 20 if the x-position, $X_B$, of the center of mass 154 of the ball 150 does not fall between the x-positions of the pins 20 of a segment 100. This is illustrated in FIG. 4 where the ball 150 tries to seat between pin P1 and P2, but pins P1 and P2 have a value of $X_1$ and $X_2$, respectively, and the center of mass 154 of ball 150 is at $X_B$, which is not an x-value between $X_1$ and $X_2$ on the x-axis. Gravity acts on the center of mass 154 of the ball 150 to move 400 the ball 150 out of that segment 100, which classifies the segment as an undesirable segment 102.

Whether an odd or an even number of possible outcome segments are used in a set 200, the number of sets 200 that can be randomly placed at the bottom 50 of the mechanical wheel 10 as shown in FIGS. 2 and 3 is equal to the number N of segments 100. That is, one set 200 of outcomes is manifest based on each possible final stopping position of the mechanical wheel 10, whether an odd number (FIG. 2) or an even number (FIG. 3) is used for set 200. By following the teachings of FIG. 4, the ball 150 when freely moving (such as bouncing) will never land and stay in an undesirable segment 102. But based on the wheel orientation (i.e., bottom 50) when the wheel is stopped, the ball will randomly (free motion) land and stay in one of the possible outcome segments in the set 200. The following discussion is divided into two parts, depending on whether an even or odd number of possible outcome segments 200 is desired by the designer.

b. Even Number of Possible Outcome Segments in Set 200:

This embodiment is illustrated in FIG. 3 of eight possible outcome segments 200. In this situation, once the wheel 10 stops, the solution starts from the bottom 50 of the wheel 10 at the pin 20. The ball 150 must be able to settle in the first four segments ("1"–"4") to the left or the first four segments to the right ("1"–"4") as the wheel stops. Starting from the bottom 50, the fifth segment (labeled 102 or undesirable) to either the left or right must fail to accommodate a settling ball 150, while the $1^{st}$ through $4^{th}$ segments (i.e., possible outcome segments 200) must accommodate the settling ball 150.

For an even number of possible outcome segments 200, the nth segment's pins 20 (denoted a and b from the bottom 50) are located at x-positions:

$$x\text{-position-}na=Rad\sin\{(n-1)(360/N)\} \quad \text{(FORMULA 3)}$$

$$x\text{-position-}nb=Rad\sin\{n(360/N)\} \quad \text{(FORMULA 4)}$$

The x-position of ball 150 is as follows:

$$x\text{-position-}nball=X\sin\{(n-½)(360/N)\} \quad \text{(FORMULA 5)}$$

For ease of calculation, the examples assume x=0 is centered on the bottom 50 of the wheel 10. In principle, the origin (0,0) may be put elsewhere for these calculations with no change in solution.

To continue the above example, assume the following nominal values of N=30 segments, S=2.75 inches, Rad=10 inches, and the number of possible segment outcomes=8. For this example, the chord distance is D=2.091 inches between pin 20 centers around the periphery 30 and X=9.0519 inches as shown in FIG. 3. As a function of the pin 20 beginning at the bottom 50 of the wheel, the table of FIG. 13 sets forth the a, b, and ball x-positions (in inches, expressed as a positive distance from the bottom of the wheel). Hence, in this example of FIG. 13, the x-ball location falls in between the bordering pins for segments "1" through "4" on the left and right sides of pin 20 located at the bottom 50 in FIG. 3. Due to the symmetry (left and right sides), the ball 150 will thus be able to "settle" (i.e., "land") into one of a total of eight possible outcome segments in set 200 as illustrated in FIG. 3 on either side of pin 20 at bottom 50 (i.e., the center of gravity 154 of ball 150 is between the pins 20). For example, in FIG. 13, for segment "3", Xa=4.067 inches and Xb=5.878 inches. The x-center of gravity for the ball is 4.526 inches which is between the aforesaid two x-values. The ball lands. All other segments 100 in the stopped wheel 10 are undesirable segments 102 and the ball 50 falls out (arrow 400), adding player suspense as to the final outcome (i.e., the x-center of gravity 154 of ball 150 is outside the pins 20, or the y-center of gravity is under the pins in the case of the segments on the top of the wheel). The dotted line in FIG. 13 separates the segments 1–4 in set 200 from the undesirable segments 102.

As another example, if nominal values of N=25 segments, S=2 inches, Rad=6 inches, and the number of possible outcome segments=6 are assumed, then D=1.504 inches and X=5.2935 inches. The results are shown in the table of FIG. 14. In this example, the ball 150 will be able to "settle" into one of a total of 6 possible outcome segments 200 (3 on either side of the pin 20 at the bottom 50). All other segments 100 are undesirable segments 102. For example in FIG. 14, for segment "4", Xa=4.107 inches and Xb=5.066 inches.

The x-center of gravity for the ball is 4.079 inches which is outside the aforesaid two x-values. The ball would not land. The dotted line separates the possible outcome segments in set 200 from the undesirable segments 102.

c. Odd Number of Possible Outcome Segments in Set 200:

As the wheel 10 stops, the solution is again described from the bottom 50 of the wheel 10. In this case, the bottom 50 of the wheel 10 is a segment 210 (instead of a pin 20 between segments 100 as discussed above) as shown in FIG. 2. Assume a total of seven possible outcome segments in set 200 as found in FIG. 2. In addition to the bottom segment 210, the ball 150 must also be able to settle in the first three segments 100 to the left or the first three segments 100 to the right of the bottom segment 210. So, denoting the bottom segment 210 as "0", the fourth segment away from the bottom is an undesirable segment 102 either to the left or right and must fail to accommodate a settling ball 150, while the segments 200 labeled "1"–"3" must land the ball 150.

For an odd number of possible outcome segments 200, the possible nth segment's pins (denoted a and b) are located at x-positions:

$$x\text{-position-}na = Rad \sin\{(n-½)(360/N)\} \quad \text{(FORMULA 6)}$$

$$x\text{-position-}nb = Rad \sin\{(n-½)(360/N)\} \quad \text{(FORMULA 7)}$$

The ball's x-position is as follows:

$$x\text{-position-}n\text{ball} = X \sin\{(n-1)(360/N)\} \quad \text{(FORMULA 8)}$$

As an example, assume nominal values of N=22 segments, S=2.6 inches, the number of possible outcome segments in set 200 equals 7, and Rad=8 inches, which results in the table of FIG. 15. The ball 150 theoretically settles into one of a total of seven possible outcome segments 200 (the bottom segment 210, plus the next 3 adjacent segments on both the left and right sides labeled "1–3"), as shown in FIG. 2. The dotted line again separates the possible outcome segments in 200 from the undesirable segments 102.

The discussion above assumes a thickness T (as shown in FIG. 4) of the pins 20 of zero. In one embodiment, the thickness T is typically of the order three-sixteenths of an inch. In practice, the thickness T of the pins 20 will serve to slightly decrease the absolute value of the x-position–nball, by at most one half the thickness T of the pins 20. For desired segments in which the ball may settle, the effect is even less pronounced. Thus, in the examples cited above, the thickness T should not appreciably affect the final performance. In practice, for any desired design configuration, a minor adjustment may be made to pin thickness T, radius Rad and/or ball 50 size S to achieve the desired results under the teachings of the present invention.

It may be seen that, in practice, a wide variety of wheel sizes having different radii (Rad), number of segments (N), ball sizes (S), and desired number of possible outcome segments in set 200 into which the ball 150 may land may be designed.

Figure 5:
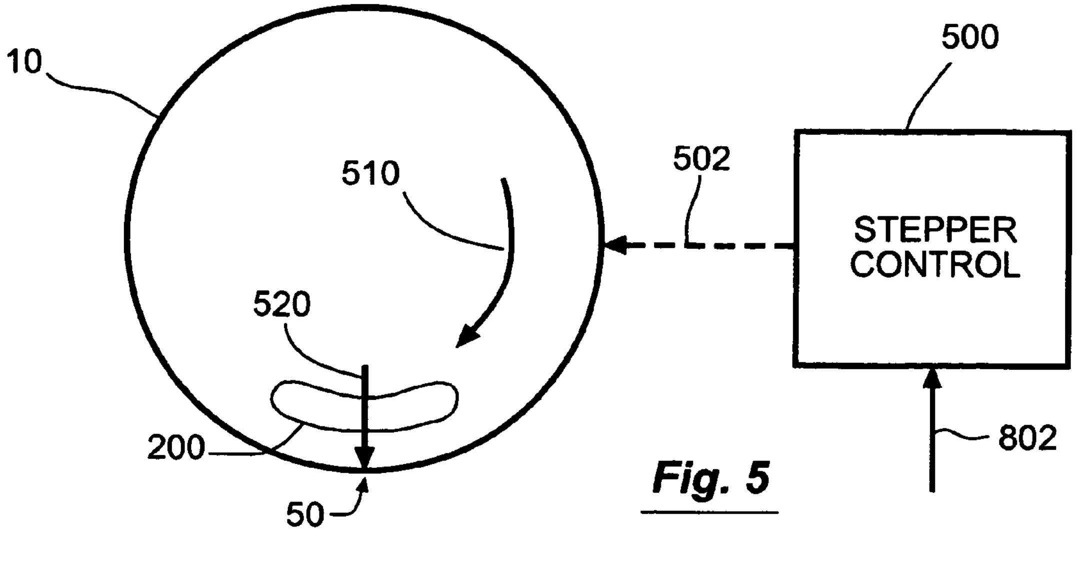
FIG. 5 sets forth the control of the wheel of the present invention.

What has been set forth above, under the teachings of the present invention, provides a plurality of possible outcome segments in a set 200 in which the ball 150 can land as the wheel stops. The ball lands in one possible outcome segment in the set just before, at, or just after the wheel is physically stopped (i.e., "as the wheel stops"). As shown, the teachings of the present invention show that a designer can adjust the number of segments, the radius of the wheel, the diameter of the ball, and the thickness of the pin to arrive at an actual mechanical casino wheel game of the present invention. As taught herein, the wheel spins and the ball freely moves and lands in only one of several predetermined possible outcome segments in a set 200 as defined relative to a final stopping orientation of the wheel.

d. Stepper Motor Control:

In the preferred embodiment as functionally shown in FIG. 5, a stepper motor 500 connected mechanically 502 to the wheel 10 drives 510 the wheel 10 and gradually slows it down, stopping it in a predefined orientation or location 520 at the bottom 50. As explained with reference to FIG. 8, a processor 800 either in software or hardware or both accesses a random number generator RNG 810 so as to determine which set 200 (i.e., segment 100 (or pin 20) therein) stops at the bottom 50. Such random number generation 810 and processor 800 control to obtain a random predefined result is well known in the gaming industry. The random number selected determines which one of the sets 200 is randomly placed at the bottom 50. Because the wheel 10 has been stopped in such a predefined orientation, the final random resting segment 100 for the freely moving ball 150 is limited (per the design of the ball/pin-spacing geometry) to one of the predefined number of possible outcome segments in the randomly placed set 200 at the bottom 50. The predefined number of final outcome segments in a set 200 for the ball 150 is preferably between 3 and 9.

Any suitable processor-controlled electro/mechanical device coupled to the wheel 10 can be used under the teachings of the present invention to effectuate spinning and then stopping of the wheel 10 at a predetermined location 520 at bottom 50. In a vertically oriented mechanical wheel, the predetermined location is preferably the bottom 50. Other embodiments are more vigorous and may use other predetermined locations. By way of example, the predetermined location could be at any one of the other possible outcome segments. The wheel need not be vertical but may be tilted.

The manner in which the possible outcome segments in a set 200 are assigned values, and the probability distribution associated with location 520 at which the wheel 10 is stopped, to yield a desired expected value and control bias is discussed next for the casino game of chance of the present invention.

e. Player Expected Value Determination:

Assume that the wheel 10 has been stopped in a particular location by the stepper control 500, and that the ball 150 will now settle (land) into one of the possible outcome segments in the set 200 positioned at that location. For simplicity, assume there are three possible outcome segments in set 200 (Bottom, Left, and Right) and that the probability distribution among these possible outcome segments in set 200 is unknown. The following analysis assumes no particular distribution among the possible outcome segments in set 200, but only that the distribution is constant regardless of where the wheel 10 is stopped. That is, i.e., if the ball 150, on average, constantly ends up in the left segment 30% of the time, the bottom segment 60% of the time, and the right segment 10% of the time, this is true regardless of where 520 the wheel 10 is stopped at the bottom 50 (that is, regardless of which set 200 is placed at the bottom 50). This assumption is reasonable provided the wheel 10 is slowed and stopped at the same rate every trial.

Without loss of generality, a probability L (or R) to the ball 150 ending in the Left (or Right) segment can be assigned. Hence, the probability of the ball 150 ending in the bottom segment B is 1–L–R. Also without loss of generality, we assume a probability distribution p, which is a function of individual segments n. The expected value (EV) that a player expects to receive over all play of the game, as a function of the values $V_n$ of the segments 100 and probabilities $p_n$ of the Value $V_n$ stopping on the bottom 50, is as follows:

$$EV=\Sigma p_n\{LV_L+RV_R+(1-L-R)V_n\} \quad \text{(FORMULA 9)}$$

Where the summation is over the segments n from n=1 to N, $$V_L=V_{(n-1)mod\ N} \text{ and } V_R=V_{(n+1)mod\ N}. \quad \text{(FORMULA 10)}$$

Note that $V_0$ is the same as $V_n$, since the wheel 10 is continuous.

Now, in Formula 9 there are two unknowns (L and R), so to find local minima/maxima, a partial derivative is needed:

$$\partial EV/\partial L=\Sigma p_n(V_L-V_n) \quad \text{(FORMULA 11)}$$

Clearly, the right-hand side of the above equation is a constant, hence either never zero or always zero, and similarly for the partial derivative with respect to R. So, the minimum/maximum EV is located at the boundaries of the range for L and R, i.e., the extrema of the plane in L, R, B space bounded by the points (L=1, R=0, B=0), (L=0, R=1, B=0), and (L=0, R=0, B=1). Put another way, the maximum and minimum values of the expected value EV, for the game of the present invention as constructed, can be determined by assuming the ball 150 either always falls into the left segment L, always fall into the bottom segment B, or always falls into the right segment R. That is, although the actual distribution of balls into the left, bottom, and right segments is unknown and presumably a mixture of the three segments, only these three pure (not mixed) possibilities need be considered to determine the minimum and maximum expected value EV of the game.

Although the above discussion was in terms of three possible outcome segments in set 200, the extension to any arbitrary number of outcome segments in set 200 is immediate and follows directly by extending the above formulae. For any game as described herein with a number of possible segments N, the extrema of the EV can be determined by considering only the cases in which the ball 150 falls 100% into each of the possible segments 200, as weighted for each stopping location.

By way of example, the table shown in FIG. 16 demonstrates a calculation for the example cited above of N=22 segments and 7 possible outcome segments in each set 200 per trial (as illustrated in FIG. 2). The columns are labeled as follows:

| | |
|---|---|
| I | Segment number "SEG", arranged counterclockwise on the wheel 10 |
| II | Award value "V" (such as dollars) for corresponding segment number |
| III | Probability of this segment ending on the bottom, "$P_B$" |
| IV | Differential EV if ball always ends 3 segments to the left of the bottom, "L3-B" |
| V | Differential EV if ball always ends 2 segments to the left of the bottom, "L2-B" |
| VI | Differential EV if ball always ends 1 segment to the left of the bottom, "L1-B" |
| VII | Partial EV if ball always ends on the bottom segment, "B" |
| VIII | Differential EV if ball always ends 1 segment to the right of the bottom, "R1-B" |
| IX | Differential EV if ball always ends 2 segments to the right of the bottom, "R2-B" |
| X | Differential EV if ball always ends 3 segments to the right of the bottom, "R3-B" |

The differential EV values are useful for understanding how much of a difference the values $V_n$ and probabilities $p_n$ are affecting the spread in expected value EV. In the table of FIG. 16, the values V are dollars, but any suitable payoff unit including a multiplier of wager, or value-in-kind could be used. It will be noted that the EV extrema for this game occur if the ball 150 always ends 1 or 2 segments to the left of the bottom (for the high end), and 3 segments to the right of the bottom (for the low end). Under the assumptions stated earlier, the overall EV for the game is constructed to be, necessarily, between 84.95−0.575=84.375 and 84.95+0.775=85.725, regardless of the actual distribution of the ball 150 landing into the 7 available segments 100 for each trial. The minimum EV is 84.375 and the maximum EV is 85.725, each of which are within 1% of the "average" EV of 84.95 (the EV associated with the bottom segment 210).

In practice, as shown above and continued here, the values $V_n$ may be manipulated to achieve the desired result, by design. Note that in this example, the wheel 10 stops with the value of V=$250.00 on the bottom fully 10% of the time ($P_{bottom}$=0.1); this is more than twice the probability if each segment 100 were equally likely. This leads to increased player excitement. Considering that the ball 150 may end up as far as 3 segments from the bottom, when finally landing, the chance of the $250.00 award being possible (that is, the $250.00 segment is located either on the bottom or within 3 segments of the bottom position) is in excess of 31% under this design. The figure of "in excess of 31%" comes about by adding the probabilities in Column III for segments 2 though 8, equal to 31.5%. Similarly, there is a 34.5% chance of a $500 award being possible. Again, this adds to the player's excitement and fuels the notion that the game is fair in terms of value.

Although the example cited herein discusses a min/max EV within roughly 1% of the average EV, the design could have the min/max differ substantially, perhaps by 25% or more if desired. Too, with an equal weighting of probability per segment 100 (i.e., each segment 100 ending on the bottom is equally likely), the min/max EV will precisely equal the average, if desired.

It is to be expressly understood that under the teachings of the present invention, by assigning values V, one to each segment 100, assigning the probability of the value landing at a predetermined stop position such as the bottom 50, and controlling the possible resting outcome segments in set 200 for the ball, the maximum EV and the minimum EV can also be mathematically determined to provide for regulatory control over the spinning wheel 10 with the freely moving ball 150. In this manner, the casino, regulators and players can be confident of the expected value. It is to be understood that by varying the number of segments 100, varying the value assigned to each segment 100, controlling the probability of each segment 100 landing at the predetermined stop position and controlling the number of possible outcome segments in a set 200, the present invention provides a wide variety of dynamic mechanical wheel, with a freely bouncing ball, casino games. Finally, the above discussion is directed to the EV for the wheel based on the above geometric and mathematical considerations. The design of bonus games for underlying gaming machines wherein the frequency of occurrence of bonus game play and the expected return for play of the underlying game are mathematically worked into the above calculations to provide an overall expected return (or house advantage) for a casino game is taught in co-pending application U.S. patent application Ser. No. 372,560, filed Aug. 11, 1999 and published Apr. 18, 2002, Publication No. 20020043759 and is herein incorporated by reference.

f. Mechanical Wheel Casino Game of Chance:

The foregoing has been discussed in terms of the mechanical wheel 10 stopping at a desired random location such as bottom 50, thereafter allowing the ball 150 to come to rest, via free-motion, into one of the possible outcome segments in the randomly placed set 200 of the wheel 10, which is held steady.

Figure 19:
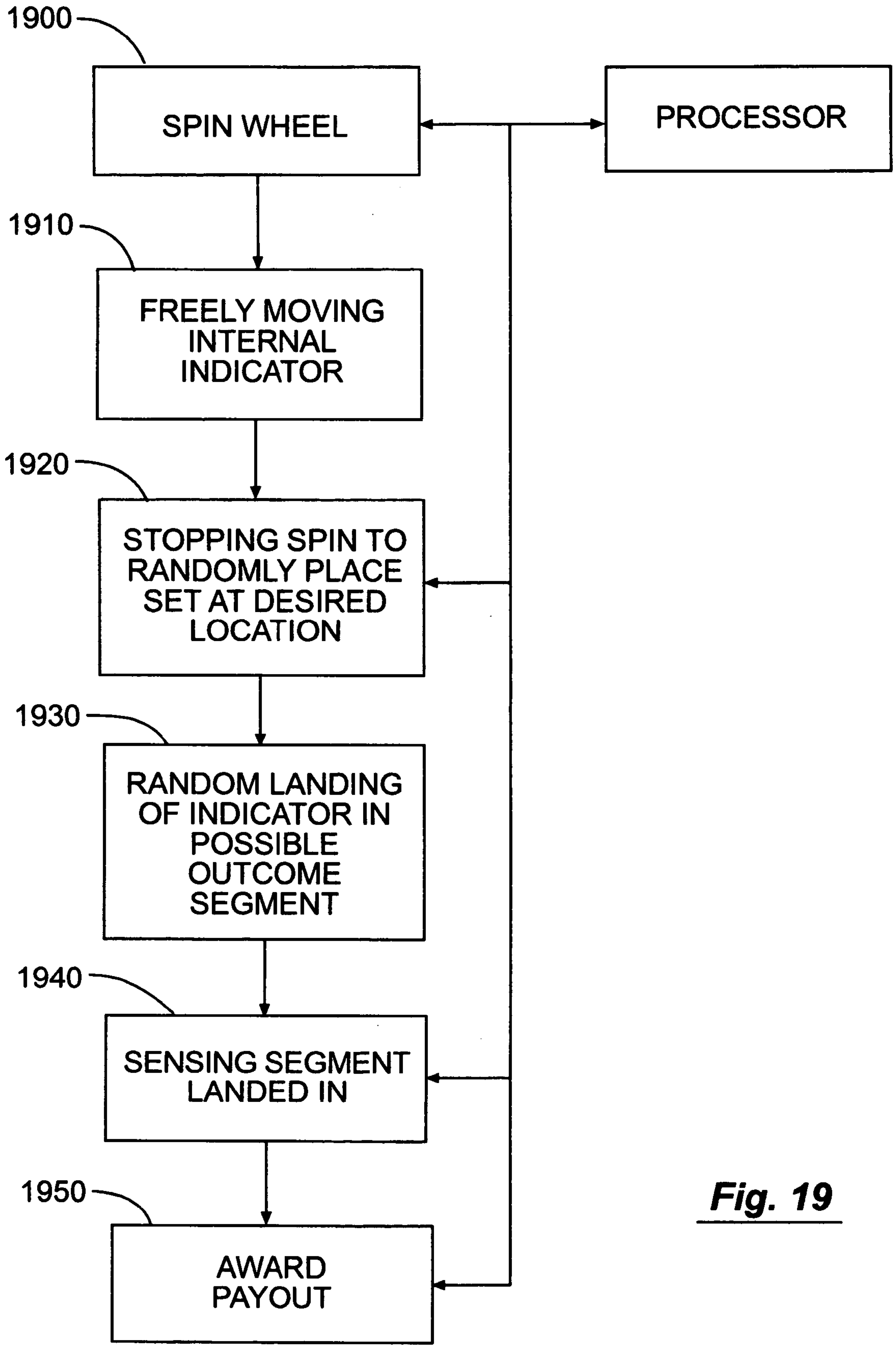
FIG. 19 sets forth the method steps of one embodiment of the present invention.

In FIG. 19, the method of the present invention for operating a casino game of chance having a mechanical wheel oriented in a vertical direction is set forth. In step 1900 the processor spins the mechanical wheel in operation of the casino game of chance such as in response to a wager or in response to a bonus condition signal from an underlying gaming machine. As the mechanical wheel spins, the internal indicator, such as a ball, freely moves within a housing of the mechanical wheel. The internal indicator can be any suitable mechanical device such as a bouncing ball. Under control of the processor, one set 200 is randomly selected (as determined from a random number generator) from a plurality of sets and then the wheel stops spinning 1920 to place the randomly selected one set at a desired location on the mechanical wheel such as at the bottom of the mechanical wheel. The number of sets corresponds to the number of segments. As the wheel stops (that is, just before, at or just after stopping), the internal indicator (e.g., ball) randomly lands (i.e., settles) 1930 in one of a plurality of possible outcome segments in the set placed at the desired location. The internal indicator can not land in any other segment as fully discussed herein. When the possible outcome segments in the randomly placed one set are disposed at the bottom of the stopped mechanical wheel, the possible outcome segments are uniformly disposed upwardly from the bottom of the stopped wheel. The processor senses 1940 the segment in which the internal indicator has landed in and then the processor awards 1950 the value associated with the segment to the player. It is to be expressly understood that the method of FIG. 18 can be implemented, as discussed herein, in any of a number of computers or processors, microprocessor controlled circuits, gaming platforms, etc.

From the player's playing perspective, the method of the present invention set forth in FIG. 19 provides a spinning mechanical wheel with a freely moving and typically highly bouncing ball within a confined housing of the wheel which then slows to a stop. The player then sees the bouncing ball settle into one of a number of possible outcome segments in the randomly selected and placed set 200 just before, at or just after stopping of the wheel.

The present invention set forth in FIG. 19 provides a dynamically moving mechanical wheel with a dynamically moving indicator such as a ball but with the assurance to the casino operator and to the player that the player's expected values for each set of the plurality of sets of possible outcome segments has a predetermined range of player expected values so that the casino game of chance has an overall predetermined range of player expected values for all play of the casino game.

It is noted that as an alternate embodiment, once the ball 150 has effectively landed or nearly so, the present invention releases the wheel 10 and simply lets gravity slowly rotate the wheel 10 so that the now-landed ball 150 rotates downward with the wheel 10 and the settled-upon segment 100 moves to the bottom 50 of the wheel 10 at the end of the casino game. This may be preferred in some cases, e.g., for aesthetic reasons. In this embodiment, a stepper motor 500 with a free-spin mode is used, or a separate brake mechanism could be used with brake activation on shaft 502 during stepping, which is then released to effectuate free spin.

An alternate embodiment is to spin the wheel 10 under stepper control 500 while slowly, very slowly, spinning until the randomly selected possible outcome segment set 200 is at the bottom 50, and then to release the wheel 10 (before stopping the wheel 10) so that both the wheel 10 and ball 150 are mechanically free. When free spin mode is used, the computer 800 may need the identity of the segment 100 (or pin 20) resting at the bottom 50 to determine orientation, so that the wheel 10 can be stepped to the next desired predetermined orientation.

Figure 20:
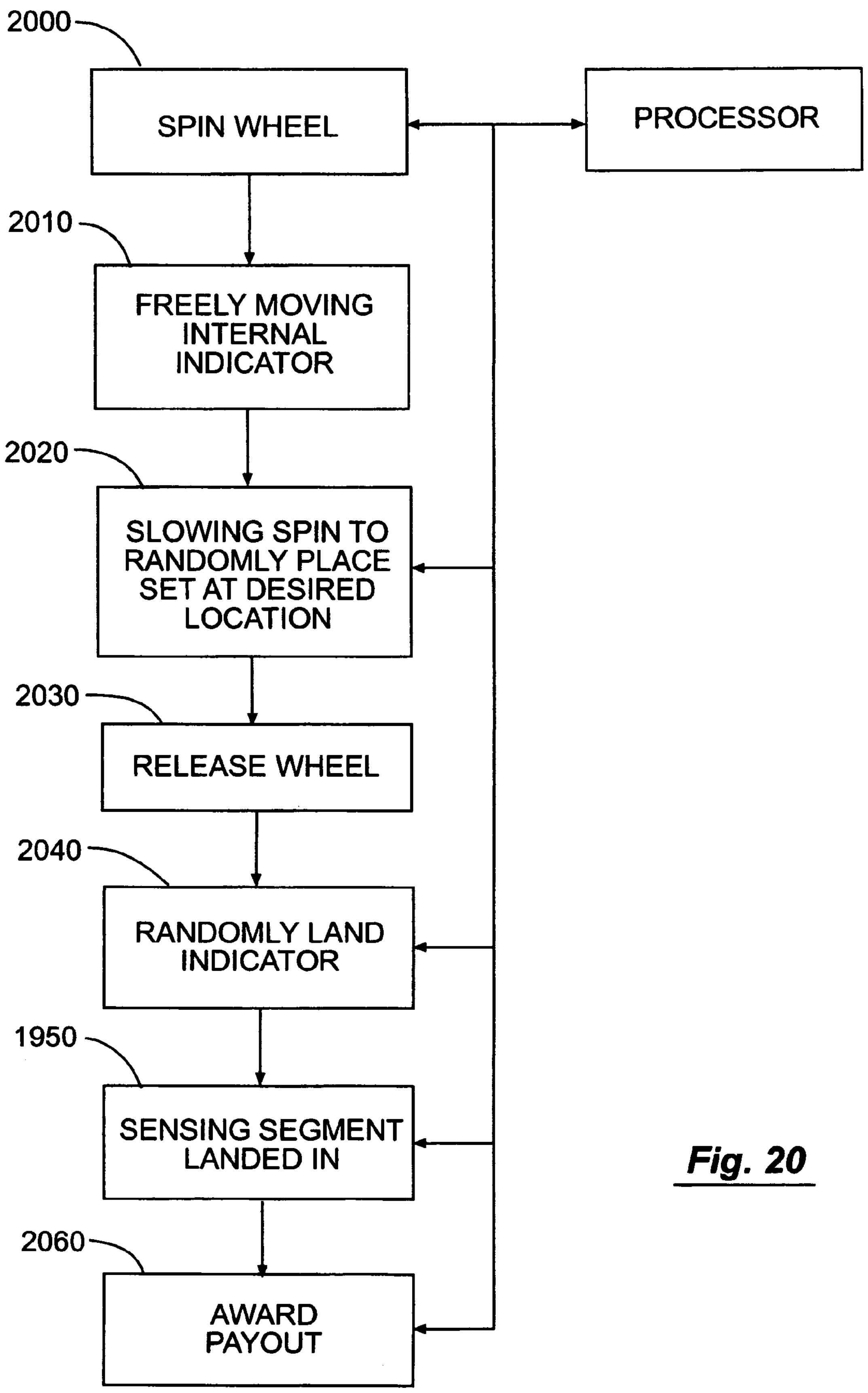
FIG. 20 sets forth the method steps of another embodiment of the present invention.

This embodiment is set forth in FIG. 20. Under processor control the mechanical wheel spins 2000. As the wheel spins 2000 the internal indicator within the confined housing the wheel freely moves therein 2010. After a predetermined time or a number of revolutions, the processor continues to slow the spinning wheel until, very slowly, the randomly selected possible outcome segment set is randomly placed at the desired location (bottom of the wheel). The processor releases 2030 the wheel just before (or just at) the desired random placement of the set. At this point, both the wheel and the indicator freely move and are not under any type of processor control. The internal indicator lands in one possible outcome segment in the set as shown in step 2040 and then the processor senses 2050 the landed in segment in step 2060. An award is then made based upon the value associated with the landed in segment. Again, in one embodiment, the internal indicator is a ball, the mechanical wheel is vertically oriented, and the desired location is at the bottom of the wheel.

g. Wheel 10 Having Free Motion:

It is also possible to drive 510 the wheel 10 at a constant rate of speed for a predetermined number of revolutions, and release the wheel 10 to free motion, i.e., not controlling its stopping location 520. In this case, the calculation would assume that each segment 100 is equally likely to be stopped on. While this has advantages in terms of more closely mimicking the California Lottery THE BIG SPIN game, it makes each segment 100 equally likely and hence limits the designer's ability, in principle, to have some segments 100 of the wheel 10 worth extreme values while maintaining a moderate overall expected value. In this case, the ability to proactively monitor the outcome, by number of outcomes for each segment 100 number, is important also to contain bias.

Figure 6:
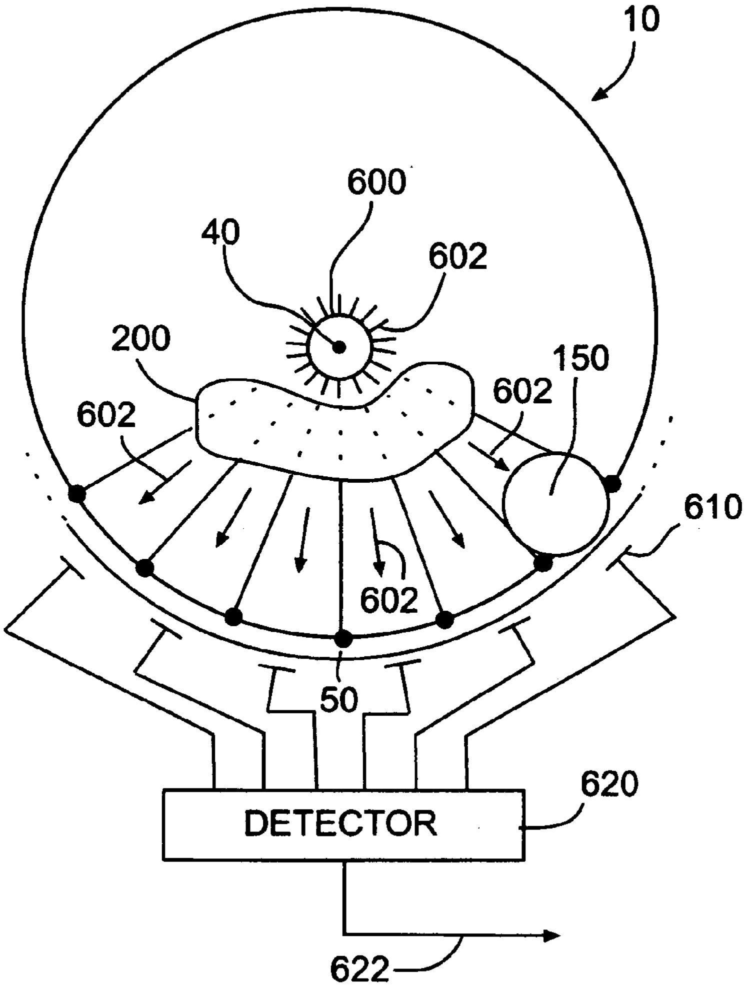
FIG. 6 illustrates the sensing of a landed ball in a possible outcome segment of a set.
Figure 21:
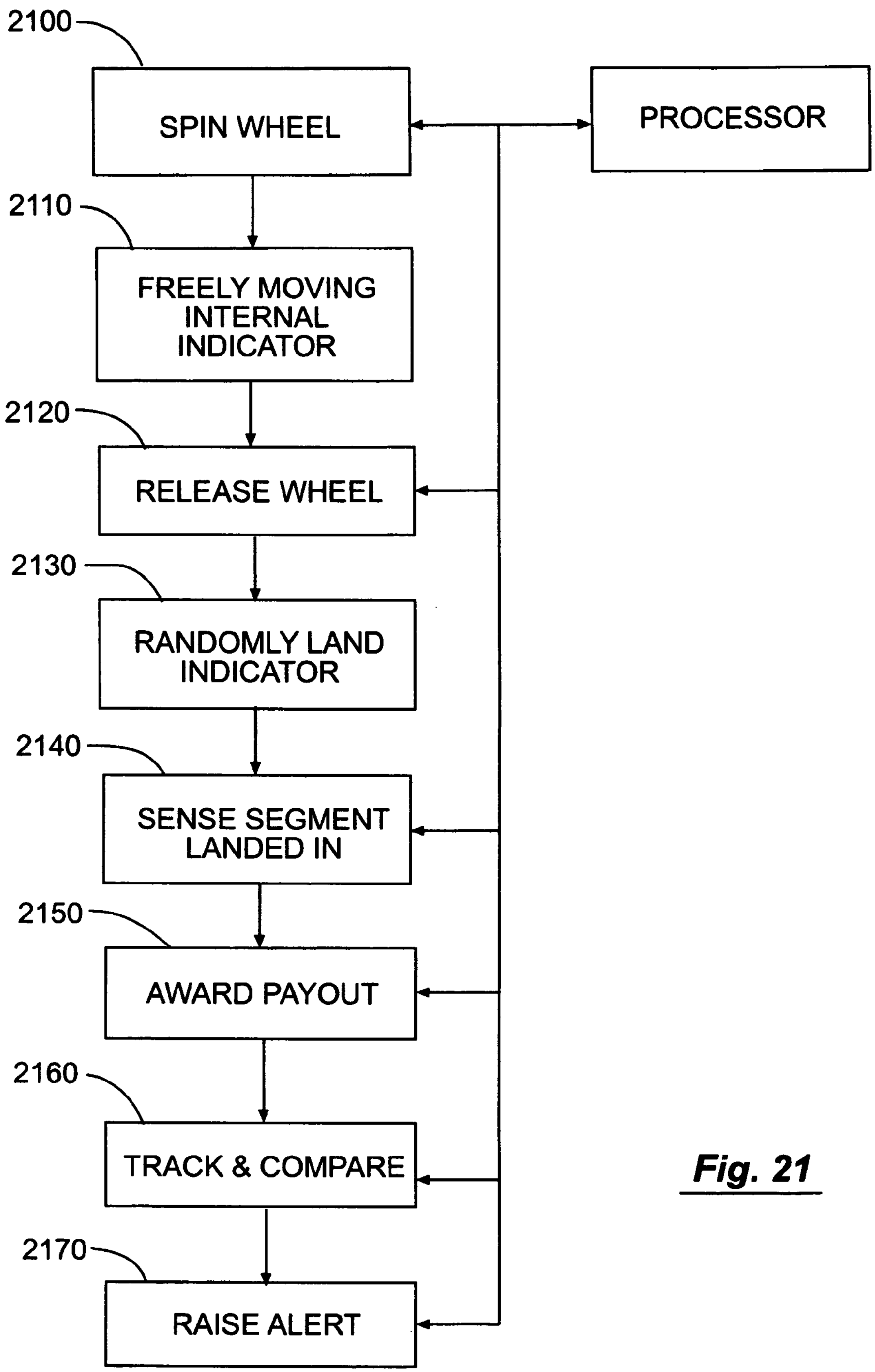
FIG. 21 is a flow chart showing the method steps for yet another embodiment of the present invention.

In FIG. 21, this alternate method is set forth. Under control of the processor the mechanical wheel spins 2100. As the wheel spins the internal indicator freely moves 2110 within a confined housing. The processor, allows the wheel to spin a predetermined number of revolutions and then releases 2120 the wheel to continue in a free spin mode. At this time, the player views a freely moving internal indicator bouncing around in the housing of the wheel and a freely moving wheel without any control by the processor. Eventually, the wheel slows (e.g., due to friction) and the internal indicator (ball) randomly lands 2130 in a segment of the wheel. The processor senses 2140 the segment landed in and awards 2150 the player a payout. The operation of the mechanical wheel game of chance of the present invention in response to a wager or in response to a bonus condition signal is then over. However in step 2160 the processor, as will be discussed subsequently, tracks the award payout and the identity of the segments landed in and compares them to player expected values for the design of the game as stored in the database of the processor. Should mechanical bias creep in to the freely moving wheel or to the freely bouncing ball as it randomly lands into a segment, the tracked results do not compare with the statistical expected random player expected values and an alert 2170 is raised to stop operation of the casino game of chance of the present invention.

h. Determining Ball 150 Position:

To determine the final resting segment 100 of the ball 150, one method is to use an optical reader. As shown in FIG. 6, the housing 1100 (see FIG. 11) of the wheel 10 contains a light source 600 at the center 40 of wheel 10, an array of light sensors 610 at each segment 100 in the possible outcome segments 200, and a detector 620 connected to the processor 800 over line 622. When the ball 150 lands in a segment 100, it obscures the light 602 from the source 600, hence all sensors 610 but one receive a signal. The sensor 610 not getting light 602 is recognized by the processor 800 as having the ball 150. Alternately, the sensors 610 may be at the wheel 10 center 40, with the source 600 outside the periphery of the wheel 10. Again, the sensor 610 not getting a light 602 signal is the one with the ball 150. Or the wheel may have a small hole near the periphery of each segment, with optical sensors 610 stationed behind the wheel at the locations of each possible outcome segment 200, such that the sensor not getting light (due to ball obscuration) is the one with the ball 150. The light source may be, for example, optical or IR. When using a reader, ambient light provided by the machine may also be used in lieu of a specific light source 600 to determine final ball location. Another possibility is to use the ball 150 as a reflector, instead of as an obscurer. Many conventional approaches could be used to detect the segment 100 the ball 150 lands in. The ball 150 could have an embedded RF ID tag and a reader or readers could be used to detect the landed-in segment 100. Any suitable electronic, electrical, optical, etc., position-sensing or weight-sensing device could be used. For example, the pins 20 could be metal, the wheel made of an insulating material and ball exterior of a non-insulating material, and an electrical path from each set of adjacent pins 20 to a current or resistance detector could be used to sense when a ball 150 lands in a segment 100 and touches both pins 20 of the segment 100.

As an alternative, when the wheel 10 is released with the settled ball 150, the ball 150 will end at the bottom 50. So it is possible to simply check (or monitor) which wheel segment 100 is at the bottom 50, and this will be the value.

i. Tracking Results:

While the invention disclosed herein, through mathematical and geometric means, limits the effects of potential bias in a mechanical apparatus, it is nevertheless useful in principle to make use of data regarding performance. United States gaming regulations strictly prohibit machines from proactively adjusting, e.g., probabilities, to get to a target hold percentage based on self-monitoring macro-variables such as coin-in and coin-out. However, a U.S. machine simply monitoring aspects of performance (such as coin-in and coin-out) is allowed. Other foreign jurisdictions may or may not allow self-monitoring.

With the popularity of mechanical bonuses, the main direction taken in development has been to predetermine their outcome such as through stepper motor control. In this case, the player is deprived of a casino game of chance with free-motion. The machine immediately tilts (voiding the game) if the mechanical apparatus does not end up in the predetermined configuration. So no need exists to monitor the mechanical performance in such casino games of chance.

A secondary direction has been to use mathematical methods to eliminate mechanical bias, so that a free-motion game may ensue (as discussed above for Pachinko). In this case, since mechanical bias is completely eliminated by the mathematical algorithm, no need exists to monitor the mechanical performance.

What has been described herein is a third possibility, one in which free-motion is employed and mechanical bias, although not eliminated completely, is carefully controlled. In cases like this, it would be beneficial as an added precaution, or perhaps to accommodate gaming regulators, to automatically track results—first, to compare results versus assumptions, and second, to compare actual results versus theoretical results—in each case to ensure that no mechanical bias or perhaps only an acceptable mechanical bias has crept in. What is taught in the following is not limited to the example of the mechanical wheel discussed above, but has application to tracking the performance of any casino gaming machine using a mechanical game play device.

For the prototypical example of a wheel 10 with 22 segments 100 and seven possible outcome segments in a set 200 per spin set forth above, several aspects of actual play verification may be addressed. These aspects may include: (1) that the expected value of the casino game of chance is within the theoretical limits, (2) that the distribution of occurrences by segment 100 is within the theoretical limits, and (3) that, per stopping position, the distribution of occurrences by segment 100 about the seven possible outcome segments 200 is uniform compared to other stopping positions.

What is collected and stored in a database is discussed in the following for each operation of the wheel 10 (i.e., completion of play to the ball landing).

Assume, the bottom segment 210 is stopped on. In this case the wheel 10 is run off a stepper motor 500 and, based on the stepper orientation, the wheel 10 location is automatically known. This is conventional in the gaming industry. Or, as an alternate design (such as the freely spinning wheel 10 in the above alternate embodiment) or in a verification design, in FIG. 7, the wheel 10 stops so that a pin 20, or in the other embodiment a segment 100, is oriented at bottom position 50. Adjacent to bottom position 50 is a sensor 700 that reads the pin 20 for bottom segment 100 (not shown). For example, the pin 20 could have a bar code, a color code, or other identification that could be read by a sensor 700 connected to a reader 710. Or, such a code could be located on the perimeter, side or edge, or back of the wheel 10. The output of the reader 710 is connected to the processor 800 over line 720. In this fashion, the precise pin 20 identification or bottom segment 210 identification can be ascertained. The system senses the actual position stopped on independent of the predetermined pin 20 or segment 100 to be stopped on by the microprocessor control 800. The identification of the segment 100 (or pin 20) identifies the possible outcome segments randomly set at the bottom. Conventional stepper machines can, if the machine is turned off and the reels spun by hand, "return" to their home machine position upon booting up. Hence, the wheel position, considered as a fourth "reel" utilizing the same technology, can be ascertained in a similar manner. The present invention can use any of a number of conventional wheel stepping electronic/mechanical arrangements.

The final segment 100 that ball 150 landed in relative to the bottom 50, as set forth in FIG. 6, is also known as discussed above. After each spin (or if desired, after each 100 or 1,000 spins, for example), a series of statistical tests are conducted to ensure the game is performing (mechanically) according to theoretical expectations. The set number of trials can be any suitable number. For a brief discussion of how such statistical testing may be done, for a flat distribution, see Vancura, *Smart Casino Gambling: How to Win More and Lose Less*, (Index Publishing) (1996), pp. 288–293, 307–309, which is herein incorporated by reference. Similar algorithmic tests may be done for non-flat distributions. For example, assume a number of desired outcome segments 200 equal to 3 on a wheel 10 with N=8 segments 100. Assume that the distribution of probabilities (L, B, R) of landing in the left, bottom, right segments 100 are uniform for play of the casino game regardless of which segment 100 is on the bottom 500. This is the assumption stated earlier, in the derivation. The database under operation of the processor tracks, by storing, the number of times each segment 100 is stopped at the bottom 50. The database also tracks, for each individual segment 100 stopping at the bottom 50, the number of times the ball 150 landed in the left, bottom, or right segment 100. For example, the database storage might look as shown, after 1,000 trials (i.e., operations of the casino game of chance), in FIG. 17.

In FIG. 17, the eight segments (1–8) of the wheel identify eight sets 200 of possible outcome segments. Each set 200 has three (odd number) possible outcome segments (L, B, and R). Being an odd number, the center possible outcome segment is placed at the bottom 50 when randomly placed with one possible outcome segment on either side. Hence, in the example of FIG. 17, the eight sets 200 are: {8,1,2}, {1,2,3}, {2,3,4}, {3,4,5}, {4,5,6}, {5,6,7}, {6,7,8}, and {7,8,1}.

To test this assumption, we may first sum the total number in the left, bottom, and right. We find # left (L)=194, # bottom (B)=494, # right (R)=312 for 1000 (total) operations. Using the resulting probabilities L=0.194, B=0.494, and R=0.312 as the expected (or norm), we may determine if any of the individual segments 100 are outside (say, +/−3 sigma or greater) that expected. By way of example, consider the L case. Multiply the L value of 0.194 by the TOTAL for each wheel segment 100 to get the number expected for the left segment 100, obtaining what is shown in FIG. 18. For example, Segment #1 TOTAL=48×0.194=9.3 (# left L—expected). The standard deviation SD (# left expected) column is the square root of the # left L (expected) column. In the aforesaid example, the square root of 9.3 is 3.1 (rounded up).

The test could comprise a comparison of the "# left L (actual)" column with the "# left L (expected)" column, measured in units of standard deviation, or SD, column. For example, for n=6 (the sixth segment on the bottom), then the Difference in SD is (34−44.6)÷6.7=−1.6. This is represented as the Difference in SD column. In a rudimentary form, the statistical check is simply whether any of the "Difference in SD" column entries has an absolute value greater than 3 (i.e., +/−3 sigma or greater) and if so, the detection of a problem and accompanying "tilt" or error message is indicated.

While we have described one test which might be done to ensure and/or control bias, other statistical tests are possible. It is possible for the expected values to be determined in advance, by trials conducted by the developer or manufacturer.

Figure 7:
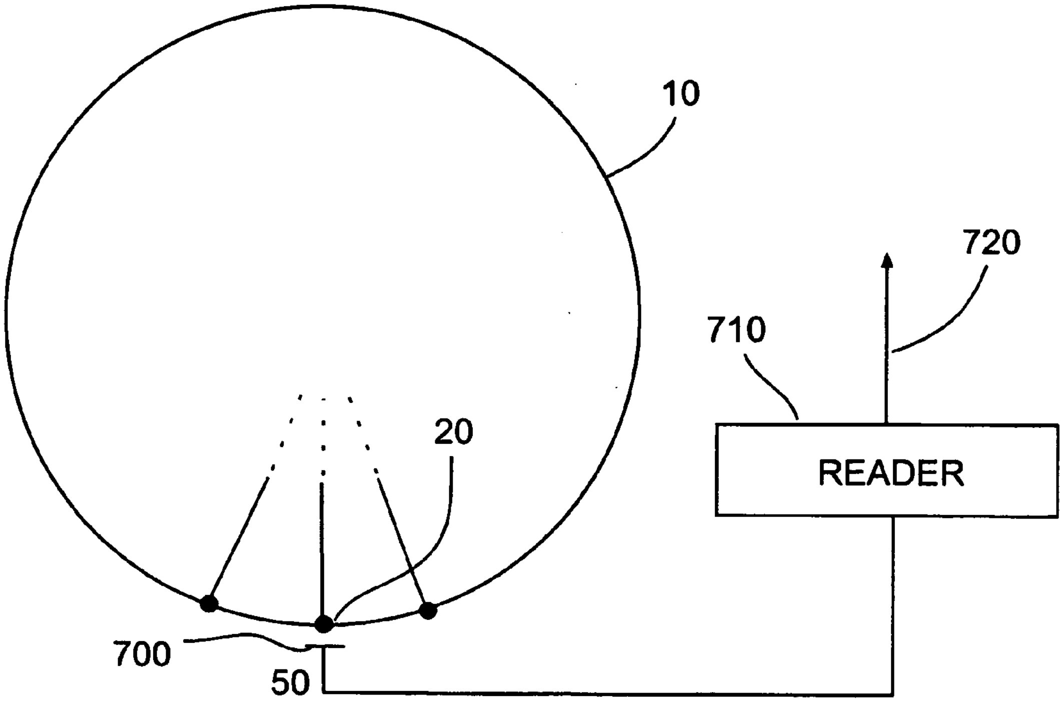
FIG. 7 illustrates the reading of the bottom pin (or segment) of the stopped wheel.
Figure 8:
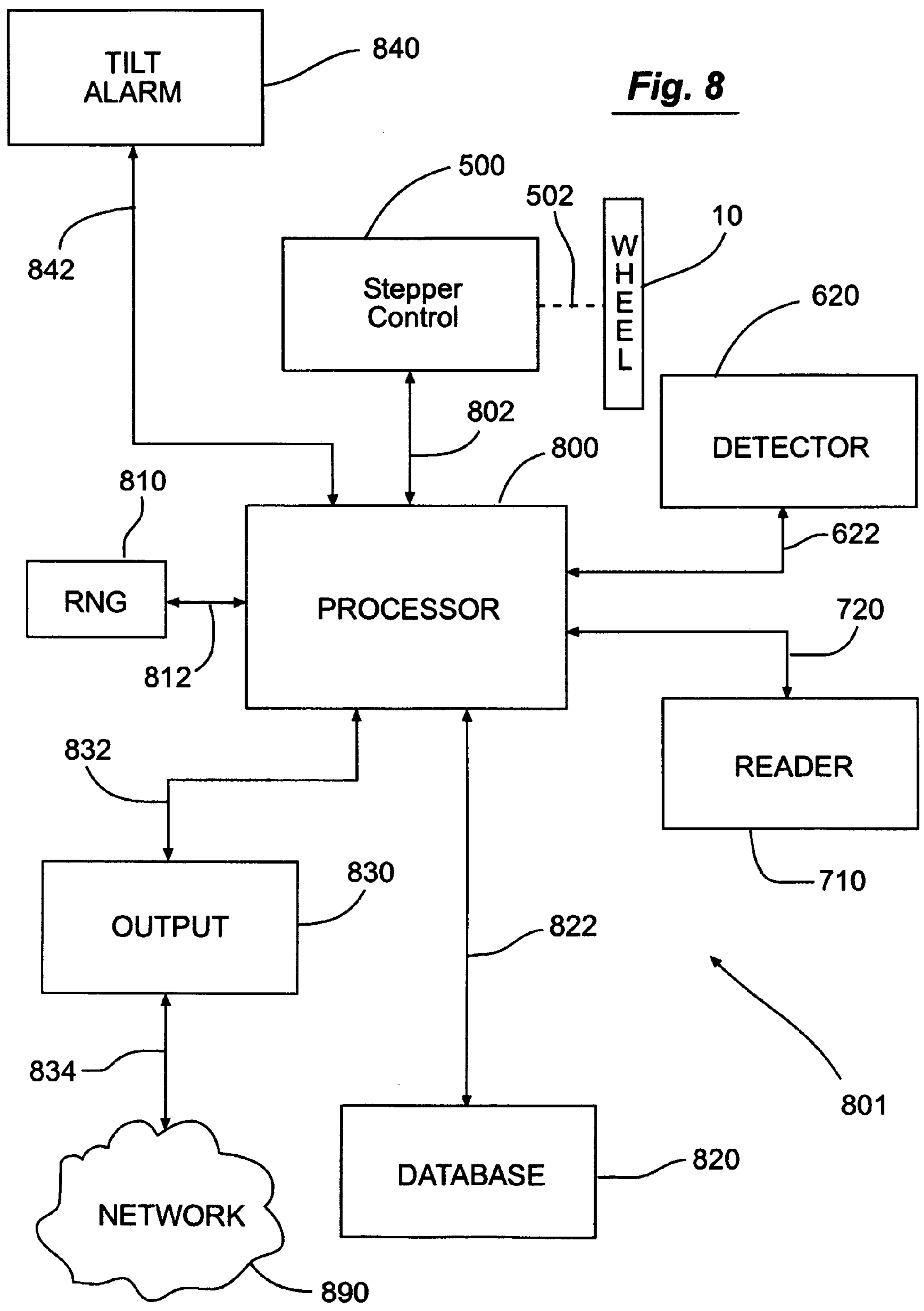
FIG. 8 is a system block diagram of the processor control of the present invention.
Figure 12:
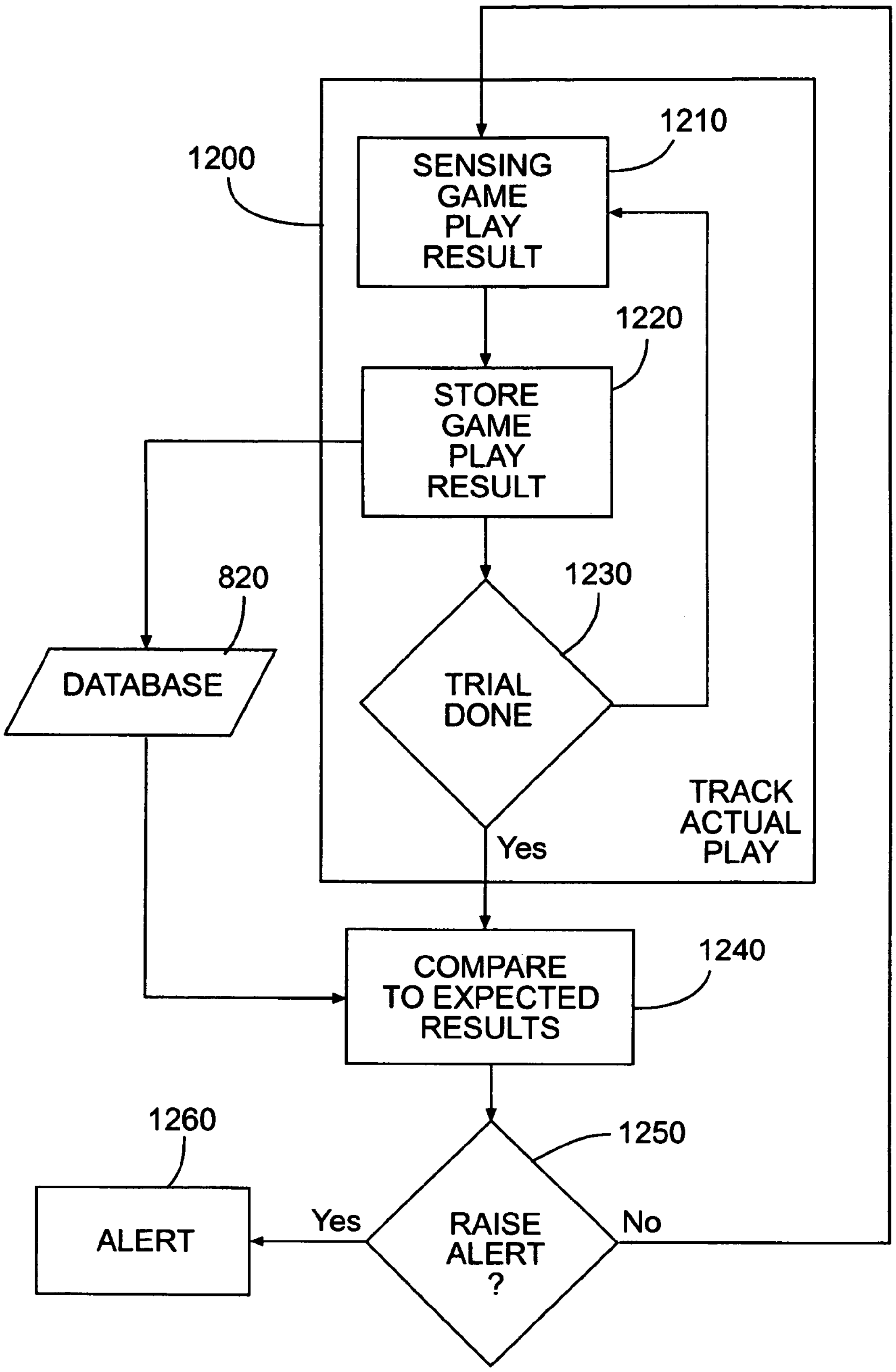

In FIG. 12, a method for monitoring the mechanical performance of mechanical components in a casino gaming machine is set forth. In the present application the example of a mechanical wheel having a freely bouncing ball has been used. However, the method of monitoring the mechanical performance is not limited to this mechanical component example. In general, the method of the present invention can be used to statistically monitor the mechanical performance of any mechanical component which contributes to a game play result in a casino gaming machine. In FIG. 12, in step 1200 the method periodically tracks the actual game play results for a set number of operations. This occurs by sensing 1210 the actual game play results, storing 1220 the actual game play results in a database such as database 820, and determining 1230 whether a set number of trials (operations) has occurred. As mentioned, the set number can be any suitable number such as after each play of the casino game, after each 100 plays, after 1,000 plays. Or, the statistical test could sense the game play result for every tenth game play for a set number, etc. This process continues as long as the statistical trial 1230 continues. However, when the trial is done, the stored actual game results for the trial are compared 1240 to the statistically expected results as fully discussed above. Many statistical determination methods can be utilized under the teachings of the present invention and the statistical methods are not limited to those discussed above with respect to the examples set forth in the tables. In step 1250, if the statistical comparison between the actual game play results and the expected game play results vary by a predetermined statistical amount, then in step 1260 raises an alert which can be any suitable alert such as a tilt indication on the actual machine so the player is warned, the sending of a communication message through output 830 to the network 890 to alert gaming personnel, etc. If the actual game play results do not vary from the statistical game results by the predetermined statistical amount, the process continues as shown in FIG. 12. The sequence of events set forth in FIG. 12 is not meant to limit the teachings of the present invention in this regard and merely sets forth one embodiment of the present invention. The present invention monitors the mechanical performance of the mechanical components in the casino gaming machine and based upon the monitoring raises an alert when mechanical bias creeps into play of the casino gaming machine.

j. System:

In FIG. 8, the computer system 801 for implementing and controlling the present invention set forth in FIGS. 1 through 7 is functionally set forth to include a processor 800 that is interconnected to the stepper control 500 over lines 802, to the detector 620 over lines 622, to the reader 710 over lines 720, and to a random number generator RNG 810 over lines 812. Furthermore, the processor 800 is interconnected to a conventional memory that includes a database 820 over lines 822 and to a conventional output 830 such as a modem or other suitable communication device over lines 832. The output 830 in turn is connected to a communication network 890 over lines 834. It is to be expressly understood that the system 801 of FIG. 8 is one of many conventional systems that can be utilized.

Figure 10:
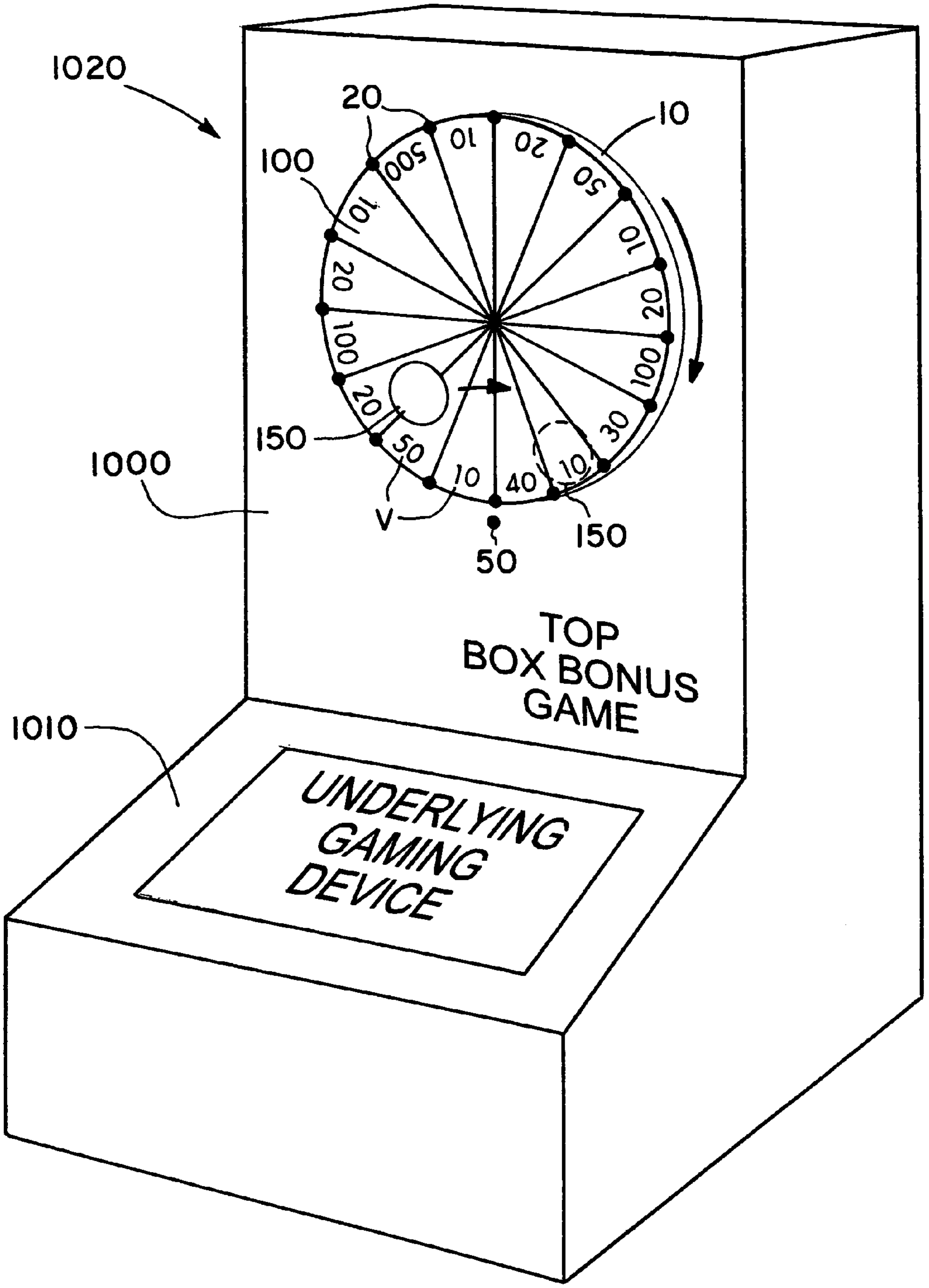
FIG. 10 is an illustration of the casino game of chance of the present invention having an underlying gaming device with a top box mechanical wheel bonus game.

The random number generator 810 and the processor 800 and the database 820 are conventional in gaming devices and could also be used to actually run the underlying game 1010 and the top box bonus game 1000 of a casino game 1020 (as shown in FIG. 10). It is to be expressly understood that many other conventional components such as wager in, cash out, credits, etc., found in conventional casino games are incorporated into the system 801 of FIG. 8 but need not be disclosed as they are not necessary to understand the teachings of the wheel 10 with internal indicator and controlled expected value of the present invention.

FIG. 8 functionally describes the system 801 used to implement the many and varied methods of the present invention. The functional components in system 801 are not to be limited by terminology. Processor is a general term used to include, but not limited to, a computer, a CPU, a gaming machine platform, microprocessor controlled circuits, etc. Processors continually evolve to include new technology.

Figure 9:
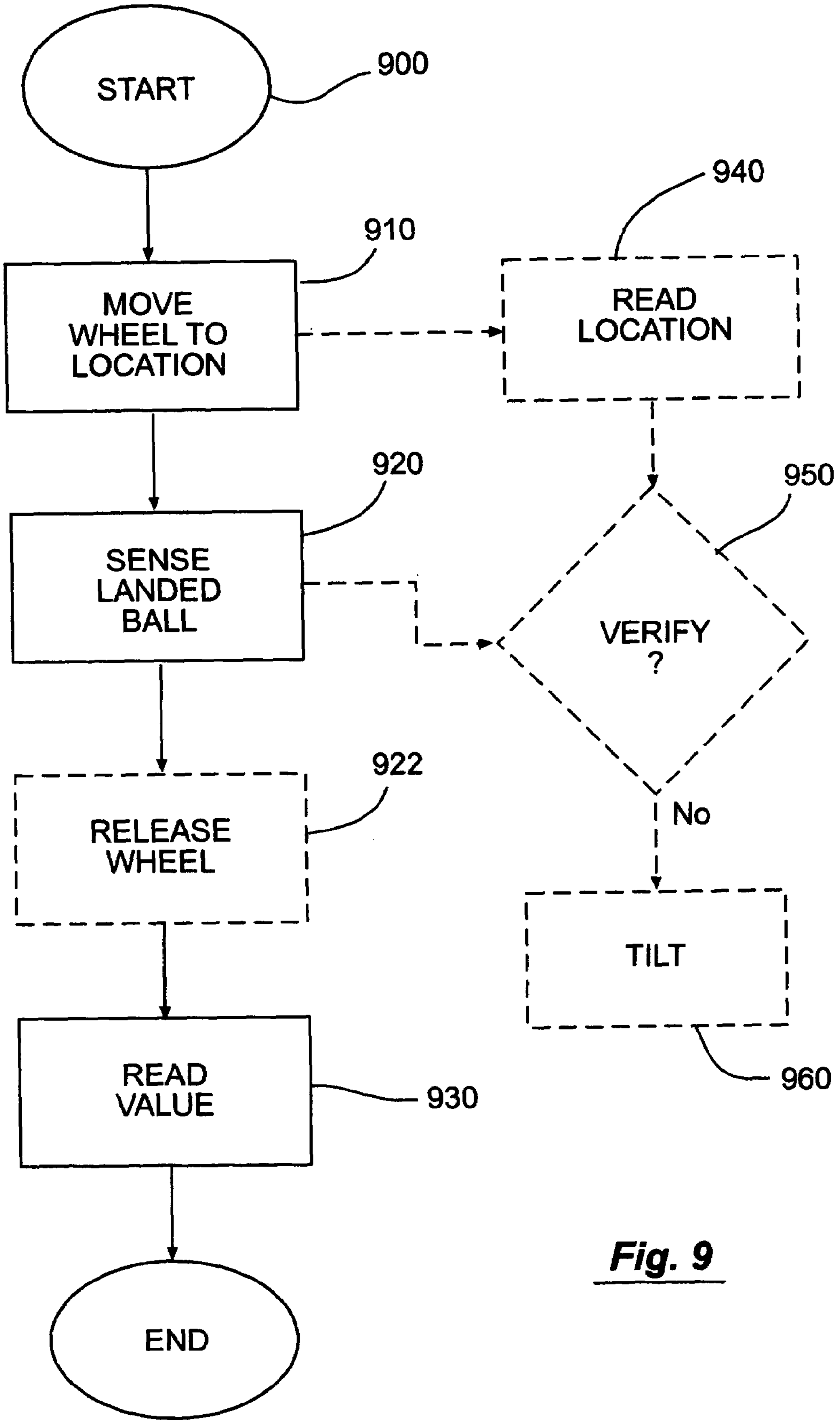
FIG. 9 sets forth the flow chart showing the method of the present invention.

There are several methods available to make use of this information. First, the data may be collected and stored in-machine such as in database 820, retrievable by a slot mechanic, e.g., via data port or wireless "wand" technology through output 830. Alternately, the data may be transferred via the Internet and/or phone lines 834 to a control center to be analyzed. Alternately, the data may be analyzed in-machine prior to retrieval and/or transfer. Finally, the machine may analyze the data internally and go into a "tilt" or other special mode if a problem is detected by activating a tilt alarm 840 over lines 842. It is important to note that the machine, in this case, is monitoring its own mechanical performance, and not violating any regulatory statutes.

k. Method:

In FIG. 9, the method of the present invention as implemented in the system 801 of FIG. 8 and as illustrated in FIGS. 1 through 7 is set forth. In a conventional fashion, the top box bonus game 1000 as shown in FIG. 10 is enabled when a bonus condition occurs in the underlying gaming device 1010. This occurs in method step 900 and it is understood that this is conventional and can occur in any of a number of conventional (or future) ways such as, but not limited to, a special bonus symbol (S) appearing in play of the underlying gaming device 1010 that affects the start 900 of the top box bonus game 1000. When this occurs, the player conventionally may or may not be asked to push a separate "Spin the Wheel" button. Again, this is all part of the start step 900 of FIG. 9. The wheel 10 moves to a predetermined location 520 at the bottom 50 in one embodiment of the present invention in method step 910. In step 910, the processor randomly selects one of the number of sets 200 based upon a random number. The processor then causes the wheel to spin and then stops the wheel with the randomly selected set 200 at the bottom 50. This is under precise control of the processor 800 as discussed above. In method step 920 the segment 100 that the ball 150 lands in is sensed by detector 620 so that the segment 100 landed in is identified and the value V of the segment 100 is paid. The segment 100 is one of the possible outcome segments in the set 200 at bottom 50. In FIG. 10, the ball 150 lands in (shown by the dotted lines) a segment 100 having a value V of $10.00. In one embodiment, step 930 is directly entered and the value of the landed-in segment 100 of $10.00 is read. This value is known since the processor 800 moves the wheel 10 to a precise stop position 520 and then receives a signal on lines 622 from detector 620 as to which segment 100 the ball 150 landed in. As discussed above, the ball 150 only lands in a possible outcome segment of the randomly placed set 200 at the bottom 50. The processor 800 can determine the value of the landed-in segment 100 by looking it up in the database 820. This is a precise memory map, table, etc. The value is read (from the player's viewpoint) and then awarded in step 930. In FIG. 10, a pin 20 is at the bottom 50 requiring an even number of segments in the sets 200. The even number could be 2, 4, 6, 8, etc. depending on the design requirement. In another embodiment, after the ball 150 has landed in step 920, step 922 is entered as an optional step and the wheel 10 that had been moved and held is then released to allow the wheel 10 to freely settle with the landed-in segment 100 oriented at the bottom 50 due to the force of gravity. Again, in step 930 the value V of the landed-in segment 100 is in one embodiment already known.

As mentioned in the verification embodiment, when the wheel 10 is moved to its predetermined location in step 910 (or when the wheel 10 is freely spun), in step 940 and as shown in FIG. 7, the reader 710 independently reads the location and delivers 720 it to the processor 800. In step 950, the processor 800 verifies this reading to its predetermined move location and, if there is an error, raises a tilt alarm in step 960, which could be a light, a data communication signal to a remote location, or to an attendant, etc. The processor 800 also verifies that the ball 150 has landed in a possible outcome segment 200 and again, if this is not correct, a tilt alarm is raised in step 960. Any type of verification can occur in this process.

Figure 11:
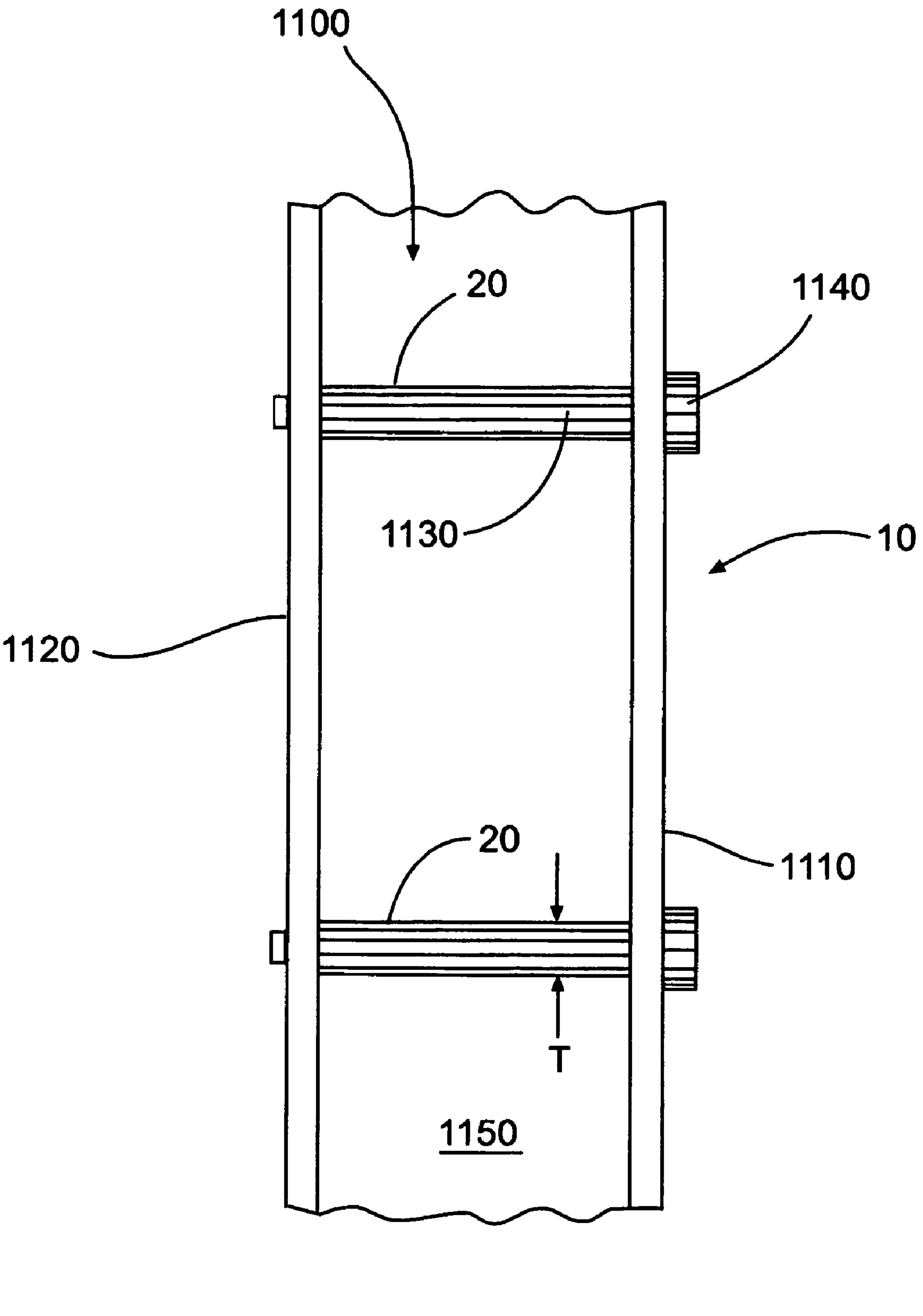
FIG. 11 sets forth the details of the wheel housing of the present invention, FIG. 12 sets forth a method for monitoring of the mechanical bias in a casino gaming machine.

In FIG. 11, the housing 1100 for the wheel 10 is shown to include a wheel support 1110 and a transparent plastic or glass face plate 1120. Each pin 20 has a bolt or screw 1130 connecting to a nut 1140 or the like in the wheel support 1110. It is to be expressly understood that any of a number of pin 20 configurations could be used to attach the view plate 1120 to the wheel support 1110. The ball 150 freely moves in the cavity 1150 contained within the housing 1100. This is but an example of a housing 1100 for the mechanical wheel of the casino game of chance of the present invention and it is not meant to limit the teachings herein. Any of a large variety of housing designs could be used under the teachings of the present invention herein. In addition to a "round" wheel design, other geometric "wheel" designs such as a square, hexagon, etc. may be used herein with pins at the periphery of segments within the wheel. In particular, a square may be stopped on its side (with each segment along the side thus possible) or on its corner (with, depending on geometric considerations of ball size and pin spacing, each segment along the two adjacent sides possible). It is to be appreciated that a "round" wheel, for example where N=30 segments, could be modified to be a polygon with 30 linear sides and that the chord D would be one such side. The mathematical equations presented herein could be changed, by one skilled in the art, to design such "polygon" wheels.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A method of operating a casino game of chance, the casino game of chance having a mechanical wheel oriented in a vertical direction, said mechanical wheel divided into a plurality of segments with each segment having an award value, the method comprising:

spinning the mechanical wheel under control of a processor;

freely moving a ball within a housing of the mechanical wheel in response to spinning;

randomly selecting one set of possible outcome sets from a plurality of sets;

stopping spin of the mechanical wheel, under control of the processor, at said randomly selected one set at the bottom of the vertically oriented mechanical wheel;

randomly landing the freely moving ball in one possible outcome segment in the randomly placed one set of possible outcome segments as the mechanical wheel stops, the possible outcome segments in the randomly placed one set uniformly disposed upwardly from the bottom of the stopped vertically oriented mechanical wheel;

sensing, under control of the processor, the one possible outcome segment the ball landed in;

awarding a payout, under control of the processor, based on the award value of the one sensed possible outcome segment the ball landed in;

the award values of each set of the plurality of sets of possible outcome segments having a range of player expected values so that the casino game of chance has an overall range of player expected values for all play of the casino game.

2. The method of claim 1 wherein the range of player expected values for at least one set of possible outcomes is different from the range of player expected values for another set of possible outcomes in the plurality of sets.

3. The method of claim 1 wherein the number of possible outcome segments in each set of the plurality of sets is an odd number.

4. The method of claim 3 wherein stopping comprises:

randomly placing a center possible outcome segment in each aforesaid set at the bottom of the mechanical wheel so that an even number of remaining possible outcome segments are on either side of the center possible outcome segment.

5. The method of claim 1 wherein the number of possible outcome segments in each set of the plurality of sets is an even number.

6. The method of claim 5 wherein stopping comprises:

randomly placing a pin, located between the two center possible outcome segments in each aforesaid set, at the bottom of the mechanical wheel so that an even number of possible outcome segments are on either side of the pin.

7. The method of claim 1 wherein the ball has a diameter, the mechanical wheel has a radius and an outer periphery and wherein landing comprises:

using the center of gravity of the ball to seat the ball between adjacent pins on either side of the one possible outcome segment that the ball randomly landed in, the adjacent pins located near the outer periphery of the mechanical wheel; the diameter of the ball, the radius of the mechanical wheel and the number of segments in the plurality of segments at least determining whether the ball seats between the adjacent pins.

8. The method of claim 1 wherein the step of spinning comprises:

rotating the wheel with a motor connected to the mechanical wheel under control of the processor.

9. The method of claim 8 wherein rotating the wheel comprises:

stepping the motor under control of the processor to randomly place the set of possible outcome segments at the bottom of the mechanical wheel.

10. The method of claim 1 further comprising:

releasing the wheel in response to randomly landing the freely moving ball to position the landed ball at the bottom of the mechanical wheel.

11. The method of claim 1 further comprising:

periodically testing, under control of the processor, the casino game of chance for mechanical bias;

automatically tracking payouts from the casino game of chance over a set number of operations in response to the periodical testing;

comparing the number of tracked payouts with expected player values;

raising an alert signal when the set number of tracked player payouts vary from the expected player values by a predetermined statistical amount so as to indicate the existence of mechanical bias in the play of the casino game of chance.

12. The method of claim 1 wherein sensing comprises:

detecting the presence of the landed ball with an optical sensor.

13. The method of claim 1 wherein sensing comprises:

detecting the presence of the landed ball with a radio frequency identification sensor.

14. A method of operating a casino game of chance, the casino game of chance having a mechanical wheel, with a radius and an outer periphery, said mechanical wheel divided into a plurality of segments with each segment having an award value, the method comprising:

spinning the mechanical wheel under control of a processor;

freely moving a ball within a housing of the mechanical wheel in response to spinning;

randomly selecting one set of possible outcome sets from a plurality of sets;

stopping spin of the mechanical wheel under control of the processor, at said randomly selected one set at the bottom of the mechanical wheel;

using the center of gravity of the ball to land the freely moving ball between adjacent pins on either side of one possible outcome segment in the randomly placed set as the mechanical wheel stops, the ball having a diameter, the adjacent pins located near the outer periphery of the mechanical wheel, the adjacent pins having a chord distance therebetween, the diameter of the ball and the chord distance between the adjacent pins at least determining whether the ball lands between the adjacent pins, the possible outcome segments in the randomly placed one set uniformly disposed at the bottom of the stopped mechanical wheel;

sensing, under control of the processor, the one possible outcome segment the ball landed in;

awarding a payout, under control of the processor, based on the award value of the one sensed possible outcome segment the ball landed in.

15. The method of claim 14 further comprising:

the award values of each set of the plurality of sets of possible outcome segments having a range of player expected values so that the casino game of chance has an overall range of player expected values for all play of the casino game, wherein the range of player expected values for at least one set of possible outcomes is different from the range of player expected values for another set of possible outcomes in the plurality of sets.

16. The method of claim 15 wherein the range of player expected values for at least one set of possible outcomes is different from the range of player expected values for another set of possible outcomes in the plurality of sets.

17. The method of claim 14 wherein the number of possible outcome segments in each set of the plurality of sets is an odd number.

18. The method of claim 17 wherein stopping comprises:

randomly placing a center possible outcome segment in each aforesaid set at the bottom of the mechanical wheel so that an even number of remaining possible outcome segments are on either side of the center possible outcome segment.

19. The method of claim 14 wherein the number of possible outcome segments in each set of the plurality of sets is an even number.

20. The method of claim 19 wherein stopping comprises:

randomly placing a pin, located between the two center possible outcome segments in each aforesaid set, at the bottom of the mechanical wheel so that an even number of possible outcome segments are on either side of the line.

21. A method of operating a casino game of chance, the casino game of chance having a mechanical wheel, said mechanical wheel divided into a plurality of segments with each segment having an award value, the method comprising:

spinning the mechanical wheel under control of a processor;

freely moving a ball within a housing of the mechanical wheel in response to spinning;

randomly selecting one set of possible outcome sets from a plurality of sets;

slowing the spin of the mechanical wheel under control of the processor to randomly place said randomly selected one set near the bottom of the mechanical wheel;

releasing the mechanical wheel from control of the processor in response to the slowing spin as the randomly placed one set approaches the bottom;

randomly landing the freely moving ball in one possible outcome segment of the one set;

sensing, under control of the processor, the one possible outcome segment the ball landed in when the one possible segment stops at the bottom of the mechanical wheel;

awarding a payout, under control of the processor, based on the award value of the one sensed possible outcome segment the ball landed in.

22. A method of operating a casino game of chance, the casino game of chance having a mechanical wheel, said mechanical wheel divided into a plurality of segments with each segment having an award value, the method comprising:

spinning the mechanical wheel under control of a processor at a constant rate for a predetermined number of revolutions;

freely moving a ball within a housing of the mechanical wheel in response to spinning;

releasing the mechanical wheel from control of the processor when the predetermined number of revolutions have occurred;

randomly landing the freely moving ball in one of the plurality of segments;

sensing, under control of the processor, the one segment the ball landed in when the one segment stops at the bottom of the mechanical wheel;

awarding a payout, under control of the processor, based on the award value of the one sensed segment the ball landed in;

automatically tracking payouts from the casino game of chance over a set number of operations of the casino game of chance;

comparing the set number of tracked payouts with expected player values for the set number of operations;

raising an alert signal when the set number of tracked player payouts vary from the expected player values by a predetermined statistical amount so as to indicate the existence of mechanical bias in the play of the casino game of chance.

* * * * *